United States Patent
McReynolds et al.

(10) Patent No.: US 11,017,111 B2
(45) Date of Patent: *May 25, 2021

(54) MESSAGING SYSTEMS AND METHODS

(71) Applicant: Safe Text Ltd., Grand Cayman (KY)

(72) Inventors: Brett David McReynolds, Las Vegas, NV (US); Thomas Christopher Whelan, Los Angeles, CA (US)

(73) Assignee: Encode Communications, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,462

(22) Filed: Jan. 13, 2020

(65) Prior Publication Data

US 2020/0151354 A1 May 14, 2020

Related U.S. Application Data

(60) Continuation of application No. 15/942,981, filed on Apr. 2, 2018, now Pat. No. 10,534,926, which is a
(Continued)

(51) Int. Cl.
*G06F 21/00* (2013.01)
*G06F 21/62* (2013.01)
(Continued)

(52) U.S. Cl.
CPC .......... *G06F 21/6218* (2013.01); *G06F 21/31* (2013.01); *G06F 21/6245* (2013.01);
(Continued)

(58) Field of Classification Search
CPC .. G06F 21/6218; G06F 21/6245; G06F 21/31; G06F 2221/2131; H04L 51/28;
(Continued)

(56) References Cited

U.S. PATENT DOCUMENTS

| 6,264,562 B1 | 7/2001 | McSheffrey et al. |
| 7,797,529 B2 | 9/2010 | Jiang et al. |

(Continued)

FOREIGN PATENT DOCUMENTS

| WO | WO-2010021862 A1 * | 2/2010 | ........... H04L 47/783 |
| WO | WO-2010133899 A1 * | 11/2010 | ......... G06F 21/6245 |
| WO | WO-2013122630 A1 * | 8/2013 | ............. H04L 67/42 |

OTHER PUBLICATIONS

"What is blocking? What happens when I block someone?", Facebook, www.facebook.com/help/131930530214371, dated by WayBack Machine Nov. 20, 2012 (Year: 2012).
(Continued)

*Primary Examiner* — John B King
(74) *Attorney, Agent, or Firm* — Akerman LLP

(57) ABSTRACT

A messaging system may include a notification module that generates a cryptic notification of one or more messages available to a first user account from one or more second user accounts. The system may receive user notification preference settings for the first user account via a user interface of an electronic user communication device that predefines the cryptic notification to be generated by the notification module for display by the user communication device when a message is available. The cryptic notification may be cloaked as an event or operation unrelated to notification of an available message.

3 Claims, 13 Drawing Sheets

Related U.S. Application Data continuation of application No. 14/875,109, filed on Oct. 5, 2015, now Pat. No. 9,934,396, which is a division of application No. 14/279,444, filed on May 16, 2014, now Pat. No. 9,361,476.

(51) Int. Cl.
  *H04L 29/06* (2006.01)
  *H04L 29/08* (2006.01)
  *H04W 4/12* (2009.01)
  *H04L 12/58* (2006.01)
  *G06F 21/31* (2013.01)

(52) U.S. Cl.
  CPC .............. *H04L 51/22* (2013.01); *H04L 51/24* (2013.01); *H04L 51/28* (2013.01); *H04L 51/32* (2013.01); *H04L 63/0245* (2013.01); *H04L 63/083* (2013.01); *H04L 63/101* (2013.01); *H04L 63/102* (2013.01); *H04L 67/1097* (2013.01); *H04L 67/306* (2013.01); *H04W 4/12* (2013.01); *G06F 2221/2131* (2013.01)

(58) Field of Classification Search
  CPC . H04L 51/32; H04L 63/0245; H04L 21/6245; H04L 51/24; H04L 51/22; H04L 67/306; H04L 21/31; H04L 63/102; H04L 67/1097; H04L 63/083; H04L 63/101; H04W 4/12
  See application file for complete search history.

(56) References Cited

U.S. PATENT DOCUMENTS

| | | |
|---|---|---|
| 7,870,479 B2 | 1/2011 | Leinfellner et al. |
| 8,065,424 B2 | 11/2011 | Foresti et al. |
| 8,219,067 B1 | 7/2012 | Haldar et al. |
| 8,261,090 B1 | 9/2012 | Matsuoka |
| 8,285,258 B2 | 10/2012 | Schultz et al. |
| 8,549,280 B2 | 10/2013 | Dagg et al. |
| 8,615,221 B1 | 12/2013 | Cosenza et al. |
| 8,923,804 B1 | 12/2014 | Aldridge, II et al. |
| 9,104,886 B1 * | 8/2015 | Dolbakian .............. G06F 21/62 |
| 2003/0033214 A1 | 2/2003 | Mikkelsen et al. |
| 2003/0120733 A1 | 6/2003 | Forman |
| 2004/0010808 A1 | 1/2004 | deCarmo |
| 2005/0053221 A1 | 3/2005 | Reding et al. |
| 2005/0064939 A1 | 3/2005 | McSheffrey et al. |
| 2007/0076646 A1 | 4/2007 | Foster |
| 2007/0282958 A1 | 12/2007 | Erikawa et al. |
| 2008/0066185 A1 | 3/2008 | Lester et al. |
| 2009/0132930 A1 | 5/2009 | Erikawa et al. |
| 2009/0165145 A1 | 6/2009 | Haapsaari et al. |
| 2010/0227631 A1 | 9/2010 | Bolton et al. |
| 2010/0287605 A1 * | 11/2010 | Strandell ............... G06F 16/954 726/7 |
| 2010/0299763 A1 | 11/2010 | Marcus et al. |
| 2011/0026704 A1 | 2/2011 | Connelly et al. |
| 2011/0061099 A1 | 3/2011 | Jiang et al. |
| 2011/0107397 A1 | 5/2011 | Niv |
| 2011/0213700 A1 | 9/2011 | Sant'Anselmo |
| 2011/0271202 A1 | 11/2011 | Wong et al. |
| 2012/0102437 A1 | 4/2012 | Worley et al. |
| 2012/0109836 A1 | 5/2012 | Chen et al. |
| 2012/0110064 A1 | 5/2012 | Chen et al. |
| 2012/0110464 A1 | 5/2012 | Chen et al. |
| 2012/0110474 A1 | 5/2012 | Chen et al. |
| 2013/0007665 A1 | 1/2013 | Chaudhri et al. |
| 2013/0031486 A1 | 1/2013 | Schultz et al. |
| 2013/0110940 A1 | 5/2013 | Pasquero et al. |
| 2013/0191911 A1 | 7/2013 | Dellinger et al. |
| 2013/0212194 A1 | 8/2013 | Shaw et al. |
| 2013/0346922 A1 | 12/2013 | Shiplacoff et al. |
| 2014/0366158 A1 | 12/2014 | Han et al. |
| 2015/0074615 A1 | 3/2015 | Han et al. |
| 2015/0089666 A1 | 3/2015 | Lee et al. |
| 2015/0256504 A1 | 9/2015 | Beausoleil et al. |
| 2016/0055490 A1 | 2/2016 | Keren et al. |
| 2017/0070870 A1 | 3/2017 | Brooks et al. |

OTHER PUBLICATIONS

"Blocking People", Instagram, www.facebook.com/help/instagram/426700567389543, dated by WayBack Machine Jun. 5, 2013 (Year: 2013).

"What happens if I accidentally approve a follower? How do I get them to unfollow me?" help.instagram.com/413012278753813, dated by WayBack Machine Jan. 1, 2013 (Year: 2013).

* cited by examiner

MESSAGING SYSTEMS AND METHODS

CROSS-REFERENCE TO RELATED APPLICATIONS

This application is a continuation of U.S. patent application Ser. No. 15/942,981, filed Apr. 2, 2018, which is a continuation of U.S. patent application Ser. No. 14/875,109, filed Oct. 5, 2015, now U.S. Pat. No. 9,934,396, which is a divisional of U.S. patent application Ser. No. 14/279,444, filed May 16, 2014, now U.S. Pat. No. 9,361,476. U.S. patent application Ser. No. 15/942,981, U.S. patent application Ser. No. 14/875,109, and U.S. patent application Ser. No. 14/279,444 are hereby incorporated herein by reference.

INVENTIVE FIELD

The present application relates to electronic communications, and more specifically to single instance electronic messaging systems and methods of user notification of messages.

BACKGROUND

Increasing use of electronic communication devices to effectuate messaging in electronic environments has vastly improved the speed and ease in which communications may be exchanged. With these improvements, however, a number of drawbacks arise from such communications. One drawback is a concern over privacy in both the short term and long term. For example, multiple or subsequent users of electronic communication devices may not be intended to view communications or receive notification that communication has previously or is taking place. Inability to modify such messages in collaborative environments is also a common drawback. In view of above, what is needed are messaging systems and methods that more adequately address privacy concerns and increase ability to collaborate.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

SUMMARY

Figure 1:
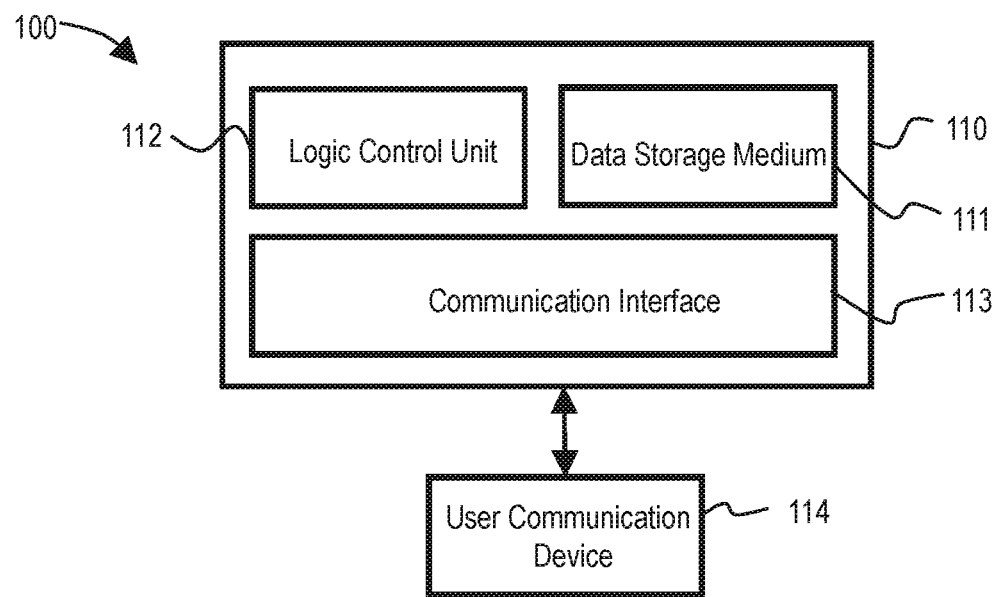
FIG. 1 is a schematic of a messaging system according to various embodiments described herein.

In one aspect, a messaging system for providing messaging service between or among user accounts comprises a message database server. The message database server comprises an account module configured to maintain a plurality of user accounts, an upload module configured to receive message data from a user communication device associated with a user account. The message data may comprise a message and a share list that authorizes one or more identified user accounts in which the message is to be shared. A single instance storage module may be configured to store the message as a single instance. A share module may be configured to share the message with the one or more user accounts identified in the share list and delete the message at a predetermined time as specified in the share list.

In a further aspect, the share list authorizes one or more user modification privileges to be provided to at least one of the one or more identified user accounts. The authorized one or more user modifications may include modification of at least the message or the share list. The user modification privileges may include one or more of editing privileges, deletion privileges, modification of share privileges with respect to one or more identified user accounts, and identification of additional user accounts in which the message is to be shared. The share list may provide a directive with respect to a time, time period, or an event that is to trigger deletion of the message data from the system. The share module may be configured to delete the message from the single instance storage module in accordance with the directive defined in the share list.

In a further aspect, the plurality of user accounts maintained in the account module may comprise user identifying data. The share module may comprise a notification module configured to generate a notification of the message to one or more user accounts in which the message is authorized to be shared. The user identifying data may be used by the message database server to identify one or more user communication devices to which the notification module is to transmit the generated notification. The plurality of user accounts maintained in the account module may comprise user notification preferences. The notification module may be configured to transmit the notification to the one or more user communication devices according to the notification preferences. The share module may comprise a retention module configured to clean the message database server of the notification and the messaging data, including the share list, when the message is deleted. The identifying data may comprise a password and access to the user account may require entering the password. The system may further comprise a password reset function configured to provide a temporary password to the user account upon request. The functionality of the temporary password and a previous password remain until one of the passwords is used. If the previous password is used first, the temporary password is terminated. If the temporary password is used first, the user account will revert back to an original state wherein all personal settings, message data authorized to share, and contacts are deleted and unrecoverable. The identifying data may comprise a username or userID. Modification of the username or userID may modify the username or userID associated with the user in all address books and block lists that include the username or userID, for example, a reference to pervious username or userID.

In another aspect, a messaging application configured to run on a user communication device to interface with a message database server comprises a messaging function and a secondary function integrated with the messaging function and configured to obscure the messaging function, wherein the messaging application is configured to be associated with a user account of the message database server and to present a notification of a message stored in the message database server in which the associated user account is authorized to access.

In a further aspect the notification may be presented as a cryptic notification disguised as an in-operation event within the operation of the secondary function. The messaging application may be configured to present identifying data to the message database server to associate the messaging application with the associated user account. The messaging application may be configured to receive or obtain notifications of new messages stored as single instances in the message database server which the associated user account is authorized to access. The messaging function may be configured to allow message data comprising messages to be prepared, uploaded, accessed, and modified from the user communication device without the message data needing to be stored on the user communication device. The messaging application may comprise a query module configured to query the message database server for notifications identifying the associated user account of available messages. The messaging application may be configured translate the notification into the in-operation event for presentation within the operation of the secondary function.

In a further aspect, the secondary function comprises a game function including a mobile game application configured to be run or simulated on the user communication device. The messaging application may comprise a login prompt configured to appear within the game function. The login prompt may be configured to receive user identifying data to authenticate the associated user account and thereafter provide access to the authenticated user account and the messages identifying the authenticated user account. The messaging application may comprise a user interface including one or more interactive menus that may be manipulated to reveal the login prompt on the user communication device. The messaging application may be configured to block access to the messaging function and return to the game function when correct identifying information is not received in the login prompt. The messaging application may comprise a stand-by mode in which the messaging function is obscured and the game function is fully operational. When the messaging application receives notification of a message, the messaging application may translate the notification to the in-game notification. The in-game notification may comprise one of a sound and vibration that is obscured as a notification that a game event is available or happened. The in-game notification may be customizable to provide details with respect the message to indicate at least one of a user account that uploaded the message, time until deletion of the message, and at least one other user account authorized to access the message. The message database server may be configured to store messages as single instances. Access to a message stored as single instances may be specified in a share list that identifies two or more user accounts authorized to view, edit, and delete the message.

In still a further aspect, a messaging system may include a notification module that generates a cryptic notification of one or more messages available to a first user account from one or more second user accounts. The system may receive user notification preference settings for the first user account via a user interface of an electronic user communication device that predefines the cryptic notification to be generated by the notification module for display by the user communication device when a message is available. The cryptic notification may be predefined to be cloaked as an event or operation unrelated to notification of an available message. The system may generate the predefined cryptic notification for display by the user communication device when a message is available to the first user account.

DETAILED DESCRIPTION

According to various embodiments described herein, a messaging system and method may be employed to provide drop dead messaging over electronic communication routes. Drop dead messaging generally includes ability of messaging users to communicate via messages in an inconspicuous manner, which, in some instances, includes communicating or providing messages in an environment wherein the messages or even mere notification of messages may be perceivable by others. For instance, a user providing a message may want to notify intended recipients or users that the message is available and where the message is located. Since it is contemplated that others may perceive the notification, the messaging systems and methods may include features configured to obscure the true purpose of the notification or even that the notification is in fact a notification. The substance of the messages may be social, business, educational, literary, mathematical, collaborative, peer review, technical, or any other message form suitable to be sent between and among users of the messaging system.

FIG. 1 is a generalized schematic of the basic organization of a messaging system 100 according to various embodiments. The messaging system 100 comprises a message database server 110. The message database server 110 may include various components and modules to perform the messaging operations disclosed herein. It is to be appreciated that the components or modules may include or use, including share, resources, hardware, processor, services, networking and communication interfaces used to access the Internet, intranets or extranets via wire, Wi-Fi, or Wireless Wide Area Networkers, memory, data storage mediums, or various resources or peripherals and may or may not be present in a single physical location. In one embodiment, the message database server includes a data storage medium 111 (e.g., hard disk, solid state storage, etc.) and a logic control unit 112 that may include a data storage controller configured to store single instance messages as well as user account data in the data storage medium 111. The logic control unit 112, such as an electronic data or computer processor, e.g., central processing unit, may be configured to receive, transmit, communicate, process, modify, maintain, provide or prevent access, distribute, delete, etc. messaging system data according to a messaging program. The messaging program may include a set of instructions which may include software, protocols, and the like, that may be executed to perform the operations of the message database server. As described in more detail below, the data storage medium 111 may further be configured to store one or more user messaging accounts and associated data.

The messaging system 100 also comprises a communication interface 113. The communication interface 113 may be configured to communicate with user communication devices 114 via electronic communication (e.g., wired, wireless, telecommunication, internet, intranet, extranet via Wi-Fi or Wireless Wide Area Networks etc.). User communication devices 114 may include electronic communication devices such phones, PDAs, mobile devices, mobile or cellular phones, smartphones, personal communication devices, electronic computing devices having communication capabilities such as computers, desktops, laptops, tablets, mainframes, etc. In various embodiments, communication may include the messaging program interfacing with a user messaging application e.g., via a virtual or distributed network, and may include a gateway, switch, router, modem, network adaptor, telecommunications transceiver, software, webpage, etc. configured to interface with users devices 114 and perform transmission, reception, and other communication functions of the system 100. For instance, messaging and communication of data between the message database server 110 and the user communication device 114 may be provided by the communication interface 113 according to protocols defined by the messaging program or user messaging application, which may include website or mobile applications stored on, accessible by, actually or virtually executed on, or otherwise configured to provide a user interface capabilities with the message database server or messaging program.

In various embodiments, the messaging system 110, communication interface 113, messaging program or application, or user communication devices 114 are configured to transmit data using secure communication routes and protocols. In one embodiment, the messaging application may be used to associate the communication device 114 with a user account, e.g., by presenting identifying data to the messaging server database. In some embodiments, messaging and communication of data may be transmitted using layered security or other adequate security measures designed to encrypt or otherwise secure the transmitted data from unwanted access, eavesdroppers, or tampering. In one embodiment, for example, messaging or communication may be transmitted using transport layer or secure sockets security protocols.

In some embodiments, a user may establish a user account with the message database server 110. The user account and user data associated with the account is typically stored and maintained by the message database server 110 in the data storage medium 111. In some embodiments, however, a portion of user data associated with the account may be at least partially stored or maintained in a storage medium associated with the user communication device 114, which may include a user messaging application configured to run or interface with the message database server 110 at the communication interface 113 to execute a user side portion of the messaging program. Thus, in some embodiments, users may communicate with the message database server 110 using user communication devices 114 and thereby access their user account.

In one embodiment, the messaging system 100 includes a messaging community comprising a plurality of user accounts. User accounts may include or be associated with user account data. The user account data may generally include settings such as preferences, notifications, user addresses or names, and identifying data. At least a portion of user account data is provided by the user. In one embodiment, preferences may be with respect to routes or manner of receiving notifications. For example, a user may provide an address, e.g., a phone number, email address, web address, social networking address, or electronic messaging address, in which the user would like to receive notifications. The address may be specific to a user communication device 114, such as a device identification address, or may be a more general address in which the notification may be accessed from multiple user communication devices 114.

In general, user identifying data may include a userID, username, password, device or application identifications, or other identifying data. Each user account may be associated with a userID for identification within the messaging community. In some embodiments, users accounts may be identified via the user communication device 114 such that the system 100 may associate the user account with a particular communication device 114 assigned to or holding the user account without additional identifying information associated with the user being presented. For example, the user account may be associated with identification associated with the user communication device 114 or a messaging application installed on the user communication device 114. In some embodiments, the user account may be associated with a username or password to verify the user or access to the user account. For example, the system 100, message database server 110, user account, or messaging application may require entry of a username or password to logon, receive notifications, perform messaging actions, or access the user account.

As stated above, user accounts may be associated with a username, userID, or both. The userID may be used by the messaging system 100 community of user accounts to identify the user, e.g., the holder of the account, or the user account for communicating messages. The userID may include a public username that may be used by other account holders to identify the user. The username may be the same as the userID or may be a private user account identifier used by the system 100 or database server 110 for verification of identity or logon. Thus, the user may disassociate its community identifier from the system 100 identifier. For example, if one of the username or userID is compromised, e.g., someone else views their username, the user or user account is not necessarily "outed" with respect to the other because the two have been disassociated. In some embodiments, the username may be associated with the userID and thus may be the same. According to one embodiment, the user may associate and disassociate the username and userID associated with their user account when desired, possibly for a fee. Thus, if either the userID or username is compromised, the user may change one of the userID or the username. The user may be prompted to enter their username and password to verify access to log onto the message database server 110, e.g., their user account, or a messaging application that may be run from the user communication device 114 and interface with the message database server 110. Notably, whether associated or disassociated, the userID and username will be generally associated with the user account by the system 100. In certain embodiments, notifications may be provided to the user communication device 114 but access to the message or message functions may require additional identifying information, e.g., username or password.

A user may obtain an account by accessing a webpage and creating an account or creating an account through a mobile application. The account may be tied to the user communication device 114 or application or may be accessed via other user communication devices through the webpage or mobile application. In one embodiment, accounts must be set up through the webpage and may not be set up through the mobile application. In another embodiment, accounts may only be set up through the mobile application.

User account data may also include a user address book. The user address book may be used to obtain, hold, search, or contain one or more user addresses or userID associated with other user accounts. Typically, the address book contains addresses or userIDs of users in which the user communicates or intends to communicate. In some instances, the address book or more generally the user data includes a block list. The user may use the block list to identify other users to block messages or notifications of such messages or the ability of a blocked user from listing the user on a share list associated with the message.

It is to be appreciated that unless stated otherwise the elements described herein may be applied in combinations other than those exemplified in the figures. Furthermore, unless stated otherwise the disclosed systems, methods, and devices for use in the systems or methods may include fewer or additional elements than illustrated and unless stated otherwise particular elements and combinations of elements may not be required in all embodiments.

Figure 2:
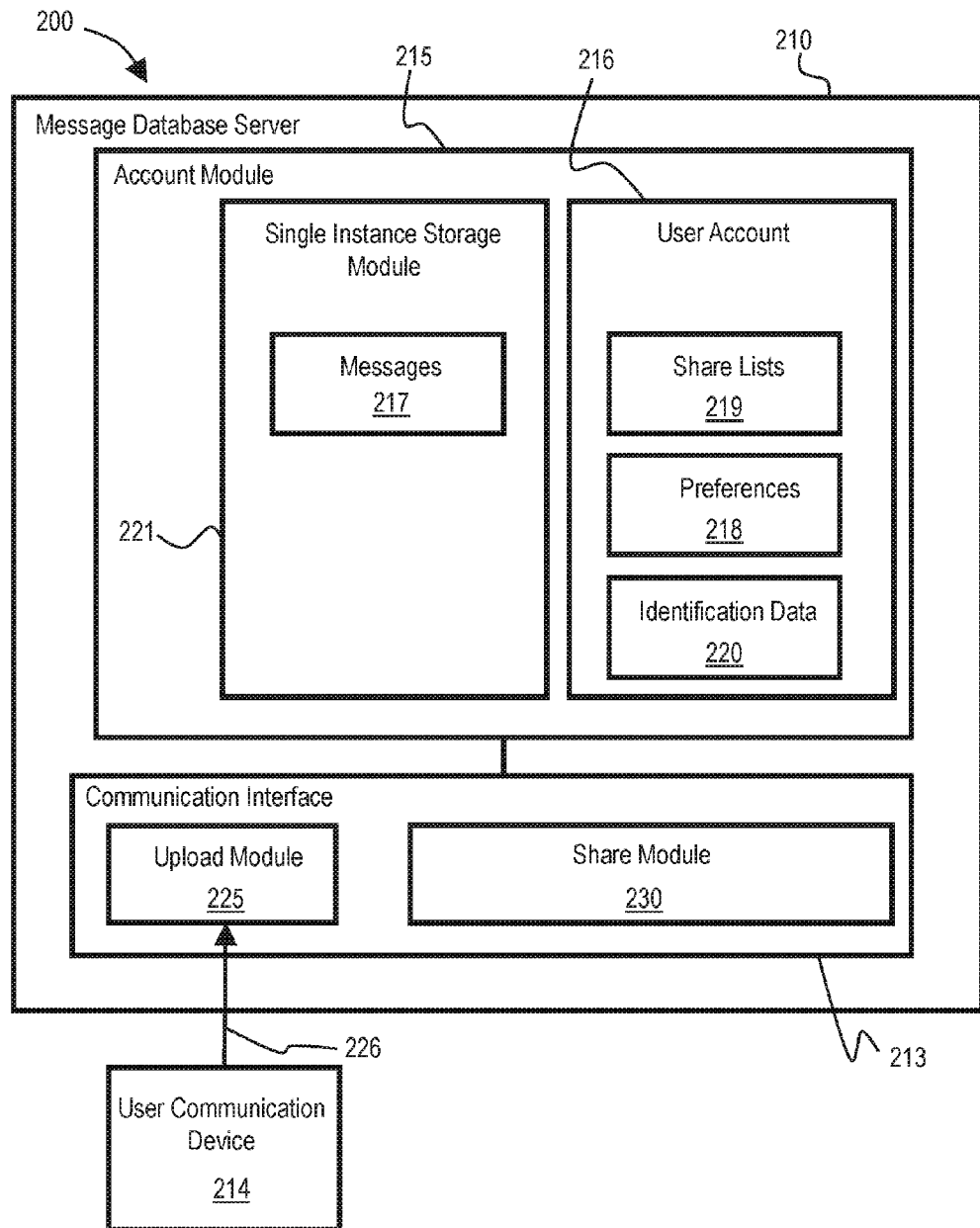
FIG. 2 is a schematic of a messaging system according to various embodiments described herein.

FIG. 2 schematically illustrates various components and operations of a messaging system 200 and operations thereof according various embodiments. The messaging system 200 includes a database server 210, which may be similar to database server 110, configured to run a messaging program. Those skilled in the art will appreciate that the messaging system 200 may be implemented in various configurations and therefore such configurations are to be considered included herein. The database server 210 comprises a communication interface 213, which may be similar to communication interface 113, configured to interface communications between the database server 210 and user communication devices 214. The database server 210 further comprises an account module 215 configured to maintain user accounts 216 and data associated with the user accounts 216, such as messages 217, preferences 218, share lists 219, or identifying information 220, which may be stored in a data storage medium such as data storage medium 112. The account module 215 includes a single instances storage module 225 configured to store messages 217 as single instances and interface with the communication interface 213 to handle single instance reception, storage, modification, presentation, and deletion of messages 217. In some embodiments, the account module 215 generates message references referencing single instance messages 217 stored in the single instance storage module in user accounts 216 identified in a share list 218 associated with the referenced message. The user accounts 216 may be accessed by associated, identified, or verified users of the account 216 via user communication devices 214, such as electronic communication devices through communication interface 213. As described in more detail below, user communication devices 214 may be operatively associated, e.g., programmed to run, a user messaging application configured to interface with the database server 210 at the communication interface 213. The messing application may be associated with a user account 216 via a login function. The user communication device 214 may also be associated with the user account 216 or the messaging application for identification of the user and user account 216. User identifying data may be held in one or more of the user account 216, in the messaging application, and the user communication device 214 to identify the user and associate the application, communication device 216, and user account 216. In one embodiment, the message server database 210 includes the messaging program operable to interface with user communication devices 214 at a webpage. Users may access the webpage and provide user identifying data, such as a username or password to log onto their user account 216 and access messages 217.

The system 200 further includes an upload module 225 which may be associated with the communication interface 213 configured to provide user upload functionalities with respect to the database server 210 and associated accounts 216. For examples, a user may use a communication device 214 to interface with the communication interface 213 of the database server 210 and upload data 226, e.g., messages 217, preferences 218, lists 219, identification data 220, and other information to be associated with their user account 216 via the upload module 225. The account module 215 and single instance storage module 221 may be configured to cooperate or operatively interface with the upload module 225 to receive and store messages 217 as single instances.

The system 200 may further include a share module 230 configured to provide share functionalities. For example, a user may use a communication devices 214 to upload a share list 219 associated with one or more messages 217 that are associated with the user's account 216 maintained by the account module 215 which includes the one or more messages 217 stored as a single instance by the single instance storage module 221. Share lists 219 may specify one or more other users that are authorized to view or take action with respect to an uploaded message 217. The share module 230 uses the share list 219 to provide access or sharing, e.g., single instance access, to users, user communication devices 214, or user accounts 216 identified in the share list 219. At least initially, only users or associated accounts 216 or devices 214 specified in the share list 219 are authorized to view the message 217. The message 217 may exists in the single instance storage module 221 of the system 200, e.g., a data storage medium 112 associated with the message database server 110, 210, as only a single instance and typically may be deleted by the author or one of the specified users in the share list 219, when such authority has been provided in the share list 219. The share module 230 may be configured to retain share lists 219 and generate message references referencing single instance messages 217 stored in the single instance storage module in user accounts 216 identified in a share list 219. Thus, the share module 230 may interface with user communication devices 214 to access and display user accounts through the account module 215. The share module 230 may use references to messages 217 stored in the single instance storage module 221 in user accounts to identify messages 217 to be shared with the user. In one embodiment, the share module 230 receives the share list 219 and generates a message ID for the message 217 and links the message ID with the identified user accounts 216. In another embodiment, the share module 230 retains references correlating user accounts 216 with messages 217 in which the account 216 has been identified in a share list 219. In another embodiment, the share lists 219 are retained by the share module 230 such that when the share module interfaces with a user communication device 214, the share module 230 may present a list of messages 217 available for the user. The share module 230 may then access the message 217 from the single instance storage module 221 and present it to the user. The share module 230 may also generate references in the user accounts 216 identifying certain messages 217 when the share module 230 maintains the share lists 219.

Figure 3:
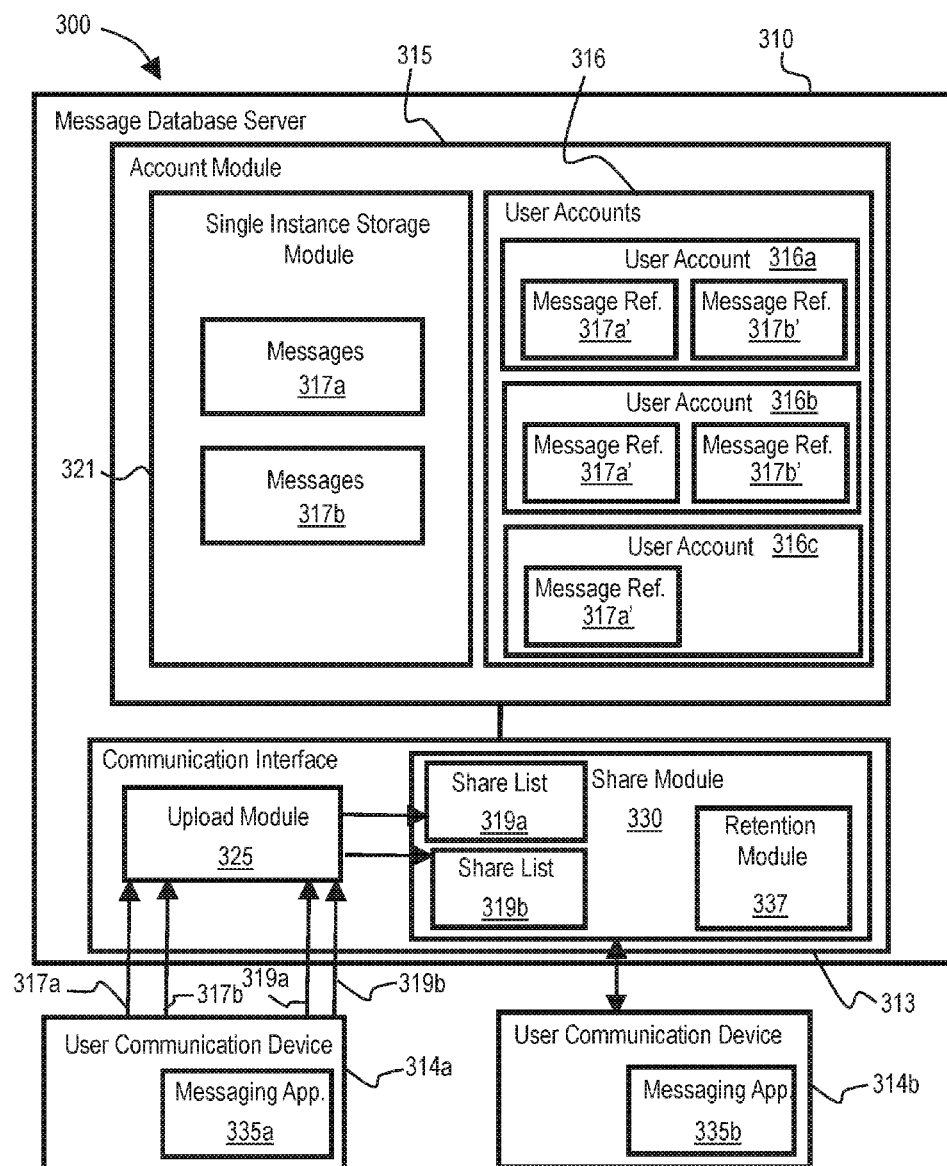
FIG. 3 is a schematic of a messaging system according to various embodiments described herein.

FIG. 3 schematically illustrates various components and operations of a messaging system 300 according to various embodiments. The messaging system 300 comprises a message database server 310 configured for messaging functions comprising uploading and sharing messages. The messaging system 300 may include elements similar to those described above with respect to messaging systems 100 and 200 or the other systems herein disclosed. For brevity, those elements having already been described with respect to preceding examples may not be again described or described in similar detail. Similar elements have been similarly identified in the figures. The message database server 310 may comprise a logic control module configured to execute the messaging program, which may at least partially embodied in instructions residing in memory, e.g., software, which may be employed to execute the operations of the message database server 310. Thus, the message database server 310 may comprise combinations of software, virtual or distributed networks, hardware such as memory, electronic storage mediums, logic and storage control units, electronic processors such as processing units and the like. The logic control module may therefore include or be associated with various message database server 300 hardware and software which may be employed to execute the operations of the message database server 310 according to the messaging program. The messaging system 300 and database server 310 may be as described above and generally comprise various components and modules configured to receive and control storage, modification, and access to a messaging as well as manage user accounts 316 or user account data.

The message database server 310 comprises a communication interface 313 having an account module 315 configured to maintain user accounts 316, three of which are shown 316a, 316b, 316c, and including a single instance storage module 321 configured to store uploaded messages 317a, 317b, a share module 330 configured to receive uploaded share lists 319a, 319b and perform specified share operations as specified in the share list 319, and an upload module 325 configured receive and upload data 317a, 317b, 319a, 319b, Still referring to FIG. 3, a first user communication device 314a is shown uploading a first message 317a and a second message 317b to the upload module 325. The first user communication device 314a is also shown uploading a first share list 319a identifying first, second, and third user accounts 316a, 316b, 316c in which the first message 317a is to be shared. The user communication device 314a is also shown uploading a second share list 319b identifying user accounts 316a, 316b in which the second message 317b is to be shared. Thus the user communication device 314a may upload a first share list 319a identifying user first, second, and third user accounts 316a, 316b, 316c authorized to share/access the first message 317a and a second share list 319b identifying first and second user accounts 316a, 316b authorized to share/access the second message 317b. The first and second share lists 319a, 319b may specificity the level or sharing or privilege with respect to message actions authorized to be taken by each user account 316a, 316b, 316c, e.g., edit, delete, additional or fewer user accounts to share, etc. In one embodiment, the single instance storage module 321 may be configured to receive the first and second messages 317a, 317b from the upload module and store the first and second messages 317a, 317b as single instances.

In system 300, the share module 330 is configured to provide an interface with the first, second, and third user accounts 316a, 316b, 316c and generate message references 317a', 317b' in the first, second, and third user accounts 316a, 316b, 316c in which the user account 316a, 316b, 316c, e.g., the associated userID, has been identified in a share list 319a, 319b associated with a message 317a, 317b maintained as a single instance in the single instance storage module 321. The share module 330 may be configured to receive the first and second share lists 319a, 319b from the upload module 325 and associate the first and second share lists 319a, 319b with the respective first and second messages 317a, 317b stored as single instances in the single instance storage module 321. In various embodiments, the share module 330 is configured to receive the first and second share lists 319a, 319b and generate or receive a message ID from the single instance storage module 321 for identifying the first and second messages 317a, 317b. For example, the share module 330 may obtain or generate a message ID that identifies the first and second message 317a, 317b such that the first and second message 317a, 317b may be accessed by the share module 330. The share module 330 may associate the message ID with the one or more userIDs or user accounts 316a, 316b, 316c identified in the share list 319a, 319b. For example, the share module 330 may associate the message ID with the one more userIDs or accounts 316a, 316b, 316c together or individually. The share module 330 may also be configured to provide a message reference 317a', 317b' in the user accounts 316a, 316b, 316c identified by the share list 319a, 319b. In some embodiments, the message references 317a', 317b', 317e may include privilege levels. The share module 330 may also update the references 317a', 317b', 317c', e.g., when privilege levels have changed or when the message 317a, 317b has been edited.

In one embodiment, the user accounts 316a, 316b, 316c may include a message view including a list of messages that the user account 316a, 316b, 316c or userID associated with the user account 316a, 316b, 316c has been authorized to access. In various embodiments, the share module 330 may provide an interface to user account data including such messaged data. The message view may include a list of relevant dates associated with the messages 317a, 317b. For example, the user accounts 316a, 316b, 316c may include a list the dates that messages 317a, 317b have been edited or are slated for deletion. In one embodiment, the user accounts 316a, 316b, 316c may list other data associated with messages 317a, 317b such as other users or user accounts 316a, 316b, 316c authorized to access the message 317a, 317b. The list may additionally or alternatively include privilege levels authorized for the user or other user accounts 316a, 316b, 316c with respect to the particular message 317a, 317b, 317c, author of the message 317a, 317b, dates that actions have been taken, date the particular message 317a, 317b, 317c is to be deleted, particular actions taken by the other authorized user accounts 316a, 316b, 316c.

In one embodiment, a message 317a, 317b and associated share list 319a, 319b are maintained by the single instance storage module 321, as in system 200, and the share module 330 is configured to query the single instance storage module 321 for instance of a user ID associated with a user account 316a, 316b, 316c to determine if the user or associated user account 316a, 316b, 316c is identified in a share list 319a, 319b for an available message 317a, 317b. As shown, the first share list 319a identifies the first, second, and third user accounts 316a, 316b, 316c and the second share list 319b identifies the first and second user accounts 316a, 316b. The second user communication device 314b is shown communicating with the message database server 310 via the share module 330 of the communication interface 313. The share module 330 or other system component may verify an account associated with the second user communication device 314b or a user with identifying data, e.g., username and password, of the second user account 316b. Here, the second user communication device 314b is verified as being associated with second user account 316b. The share module 330 is configured to check the second user account 316b for available messages 317a, 317b against the share lists 319a. 319b. This operation may be performed prior to access, e.g., by generation of message references 317a', 317b' that the second user communication device 314b may view via the share module 330. The second user communication device 314b my request or click on the message reference 317a', 317b' to access either single instance message 317a, 317b and perform messaging actions according the privilege level or authorizations specified in the respective share list 319a, 319b for each message 317a, 317b.

User communication devices 314a, 314b may include or be configured to run, interface, or display a user messaging application 335 configured to interface with the message database server 310 at the communication interface 321. The messaging application 335a, 335b may be configured to provide messaging communication via the user communication device 314a, 314b with the message database server 310. The messaging application 335a, 335b may comprise instructions stored in an electronic storage medium configured to store a set of executable instructions that when executed on the message database server 310 run or simulate the messaging application 335a, 335b on the user communication device 314a, 314b. In various embodiments, the first user communication device 314a may upload the first or second share lists 319a, 319b or a modified first and second share list (not shown) to replace the first and second share list 319a, 319b to the message database server 310 at the same time or subsequent to uploading the first and second message 317a, 317b. The first user communication device 314a may provide identifying information to log onto the system 300, which may be referred to herein as logging into the associated user account 314a of the user communication device 314a or messaging application 335a. A portion of the identifying information may be provided by identifying information related to the first messaging application 335a or the first user communication device 314a to associate the first messaging application 335a or device 314a with the user account 314a. A username or password may also be required to be entered into the messaging application 335 for user verification.

In one embodiment, the first user communication device 314a is configured via the first application program 335a to indicate one or more stored share lists 319a, 319b to apply to or associate with the uploaded message 317a, 317b. The stored shared lists 319a, 319b may be previously defined lists available for quick application to a message 317a, 317b. The upload module 325 may be configured to receive messages 317a, 317b and share lists 319a, 319b from user accounts 316a, 316b, 316c, e.g., via the first user communication device 314a logged into the application 335, system 300, or otherwise authenticated as associated with a user account 316a, 316b, 316c. In one embodiment, the second user device 314b may be configured to query for notifications of share lists 319a, 319b in which the associated second user account 316b, e.g., associated via identifying information, is identified or authorized to access or share messages 317a, 317b. In some embodiments, notifications may also be sent to the second user communication device 314b or messaging application 335b, to provide notification of share lists 319a, 319b identifying the associated second user account 316b. Upon verification, the second user communication device 314b may access its associated second user account 316b to perform messaging actions, e.g., using the share module 330, to view, create, send, edit, or delete messages in which the second user account 314b has been authorized to access or share according to the authorizations and privileges specified in the associated share list 319a, 319b. Thus, in FIG. 3, the second user account 314b has been identified as authorized to share the first and second messages 317a, 317b and may do so using the second user communication device 314b according to the specifications provided in the respective first and second share lists 319a, 319b granting that authority.

In various embodiments, the first user communication device 314a may use the first messaging application 335a to generate the first and second share lists 319a, 319b associated with the respective first and second messages 317a, 317b. Each share list 319a, 319b may provide a list of one or more users, e.g., userIDs, user accounts 316a, 316b, 316c, or user communication devices 314a, 314b authorized to view the message 317a, 317b. The share list 319a, 319b may also provide a list of one or more users authorized to modify the message 317a, 317b, e.g., edit, add, or delete. The user, via the first user communication device 314a, may communicate the message 317a, 317b and the share list 319a, 319b via the upload module 325 with the message database server 310. It is to be appreciated that, in some embodiments, the user may compose or draft messages 317a, 317b or share lists 319a, 319b partially or entirely through the messaging application 335a, 335b such that the first user communication device 314a does not store the message 317a, 317b or share list 319a, 319b. Thus, the messaging application 335a, 335b may be configured to hide, block, or obscure the message 317a, 317b from permanent or persistent data storage processes with respect to the user communication device 314a, 314b.

In one embodiment, read, edit, or delete receipts or notifications may be provided to all or some of the users identified in a share list 319a, 319b. In one embodiment, users may log onto their account 316a, 316b, 316c and receive notifications or query the database server 310, e.g., the share module 330, for messages 317a, 317b even before receiving a notification or alert. The message 317a, 317b may be viewed by authorized users but is not stored on any user or author communication device 314a, 314b. After a specified period of time the message 317a, 317b may be deleted automatically if the message 317a, 317b has not already been deleted by either the author or a specified recipient. In some embodiments, the message database server 310 comprises a retention module 337. The retention module 337 is configured to perform various maintenance operations. For example, the retention module 337 may be configured to retain the message 317a, 317b as a single instance in the single instance storage module 321 until the message 317a, 317b is to be deleted, at which time the retention module 337 may delete the message 317a, 317b from the message database server 310.

In certain embodiments, the retention module 337 may further perform various cleaning functions, such as deleting share list data or cleansing the message database server 310 of notification data. In at least one embodiment, the retention module is configured to perform a data wipe, not merely an overwrite, operation to completely remove message data or identifying data. As described above, the share list 319a, 319b may identify a period of time in which the message 317a, 317b is to be available or when the message 317a, 317b is to be deleted, e.g., after a specified number of views or after all the one or more second users have viewed the message 317a, 317b. In some instances, the share list 319a, 319b may also identify or associate modification privileges to the first user as well as one or more second users that may comprise authorization to delete the message 317a, 317b at will, at, before, or after a specified time or period of time, after a certain number of views or modifications, etc. Thus, when the message 317a, 317b is called to be deleted in accordance with the share list 319a, 319b privileges or directives, the retention module 337 may delete or wipe the message 317a, 317b from the message database server 310 messaging data and clean the server of references, pointers, notifications, or share list data. In various embodiments, the share module 330 may be configured to communicate with the single instance storage module 321 to delete messages 317a, 317b as specified by share lists 319a, 319b or the single instance storage module 321 may be configured to perform the above operations described above with respect to the retention module 337.

Figure 4:
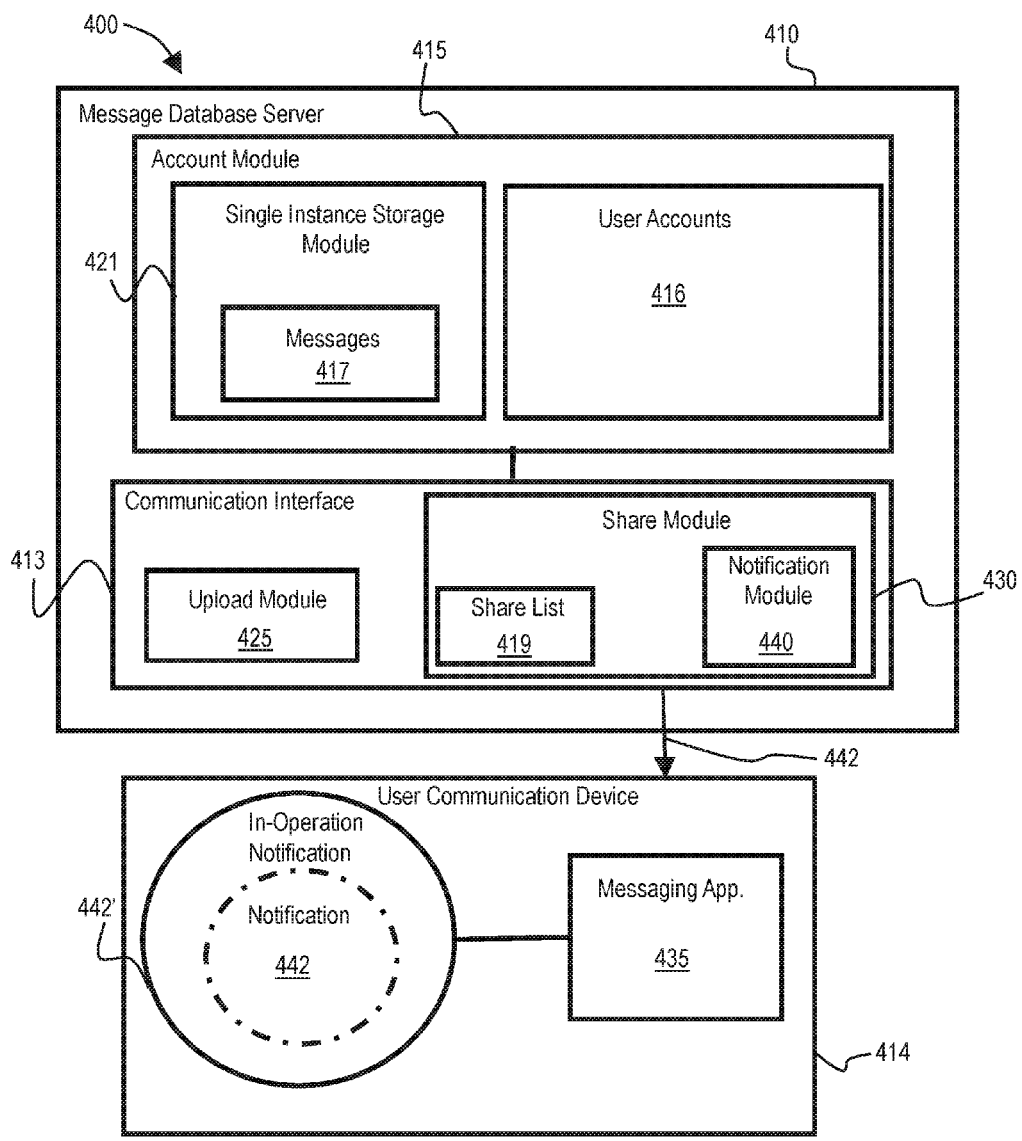
FIG. 4 is a schematic of a messaging system according to various embodiments described herein.

FIG. 4 schematically illustrates a further embodiment of a messaging system 400 wherein the communication interface 413 comprises a share module 430 that includes a notification module 440. The messaging system 400 may include all or some of the elements described above with respect to systems 100, 200, 300 and elsewhere unless stated otherwise. Various embodiments of the communication interface module 413 are suitable for use in messaging systems 100, 200, 300. It is to be appreciated that the various functionalities described herein with respect to the various modules may be shared by multiple modules associated with the message database server 410, user communication device 414 or application 435, or combinations thereof. The notification module 440 may generate a notification 442 to one or more users identified in a share list 419 that a message 417 may be accessed. In one embodiment, all identified users are notified. Notifications 442 may include notifications that a notification 442 or message is available, which may be associated with a change or modification of a message or message privileges or the availability of a new or updated message. The notification 442 may be provided periodically, when a share list 419 is received identifying a message 417 is ready, or at other times determined by the system 400 or which may be provided in the user account 416 preferences.

In various embodiments, the share module 430 comprises a message access portal configured to link or otherwise provide the user with access to messages 417 stored as single instances in the single instance storage module 421. The link may be provided through the user account 416 or through the share module 430 from the single instance storage module 421. The message access portal may be integrated with the share module 430 and may allow the user to view, modify, or take additional messaging actions with respect to the message 417. The actions the user is authorized to take are generally defined by the privileges specified in the share list 419. For example, the modification privileges may include editing privileges, deletion privileges, additional sharing or invitation privileges. The user that uploads the message 417 and share list 419 may choose to retain modification privileges, e.g., to modify the message 417 or share list 419 to modify the additional users in which the message 417 may be shared and the privileges associated therewith. However, in various embodiments, the user may set or selectively delegate modification or other privileges in any combination.

User accounts 416 may include notification preferences defined by users, as introduced above. Users may also provide the message database server 410 with one or more electronic addresses in which notifications 442 may be routed for delivery. The users may add or modify notification preferences which may be associated with the user. The preferences may be stored in the account data module 415 of the message database server 410 or on the user communication device 414 and made available through operation of the messaging application 435. For example, a user may indicate a preference to be notified of a notification 442 or message 417 at a particular electronic address or a particular electronic device. The user may also indicate how notifications 442 are to be presented. For example, the user may set a preference that messages 417 from certain users or notifications 442 thereof may be presented in a first manner while messages 417 from other users or notifications 442 thereof may be presented in a second, third, or additional manner. The electronic address may be associated with a particular user communication device 414 or may be an account, such as a text messaging, email, social networking, etc. account that may be accessed from multiple user communication devices. The user may similarly indicate a preference for notifications 442 to be delivered as above but which may directly link the user to access the message 417 via the messaging access portal, rather than requiring the user to separately access the user's account 416 on the message database server 410.

In some embodiments, the messaging application 435 or the message database server 410 via the notification module 440 may encode, morph, or translate the notification 442 in such a way as to obviate the true nature of the notification 442 to those that may view, hear, feel, or otherwise perceive the notification 442. For example, the user may provide preferences regarding presentation and receipt of notifications 442 defining how notifications are to be translated into a cryptic notification 442, e.g., disguised as an in-operation event, in which the user may decipher but which others may not. As explained in more detail below, the notifications 442 may be obviated in such a way that the notifications 442 are integrated into or simulated as a normal or ubiquitous device function or operation in such a way that such an in-operation notification 442' will be perceived by others as unrelated to a message notification 442. For example, the notification 442 may be an in-operation notification 442' that cloaks the notification 442 as an in-operation event of a secondary function or operation that is not perceived by unintended recipients to be the notification 442.

In various embodiments, the notification module 440 may deliver the notifications 442 to user accounts 416. In one embodiment, the notification module 440 may deliver a notification 442 to a user via the user communication device 414 identified by the user as an approved or authorized user communication device 414 to receive notifications 442, e.g., according to notification preferences associated with the user account 416. The notification 442 may be a notification 442 of the presence of a notification 442 or reference in the user's account 416 or a notification 442 of a message 417, which may include message details. In some embodiments, the notification module 440 may not provide notifications 442 to a user communication device 414 but rather may be configured to maintain a listing of generated notifications 442, e.g., by message ID, userID, that may be queried. The listing may further include reference to the share list 419 or message details, such as message privileges and settings. It is to be appreciated that, in some embodiments, the notification module 440 may deliver notifications as well as generate a notification listing that may be queried by the system 400, e.g., by the share module 430, user communication device 414, or user accounts 416.

In various embodiments, the notification module 440 may be configured to generate and transmit notifications 442 to user communication devices 414 according to the predefined notification settings of each user account 416 or communication device 414. For example, the notification settings may be predefined with respect to one or more of time of day, manner or route of presentation, user communication device, electronic address, as well as combinations of the above. The notification setting may also predefine if notifications 442 should be automatically delivered, delivered only when the messaging application 435 or device 414 is in a particular mode, or delivered only when requested by the user account via the messaging application 435. The messaging application 435 may query the notification module 440, share module 430, or a query module, depending on the configuration and which module is present and assigned to respond to the messaging application 435. Type and manner of presentation notifications 442 may be modified by the interactions between the messaging application 435 and message database server 410 according to preferences provided by the user.

In various embodiments, the share module 430, or, in some instances, the user communication device 414 or message application 435 comprises a query module. In one embodiment, both the messaging application 435 and the share module 430 comprise a query module to interface the two sides of the system 400 to provide notification 442 of messages 417. The query module may be in addition to or instead of the notification module 440. The query module may be configured to query the notification module 440 or user accounts 416 for available notifications 440 or links to messages 417 stored in the single instance storage module 421. The query module may be configured to interface or otherwise communicate with the user communication device 417 via the messaging application 435 to perform query operations. The user may provide identifying information, such as a password, to access the messaging application 435, which may further allow the user to access the user's account 416, e.g., log onto the user's account. Once logged in, the user may check to see if any notifications 442 have been generated or delivered to the account. In one embodiment, the query module is configured to query the single instance storage module 421 for a user ID or account associated with messages 417 stored in the single instance storage module 421.

Figure 5:
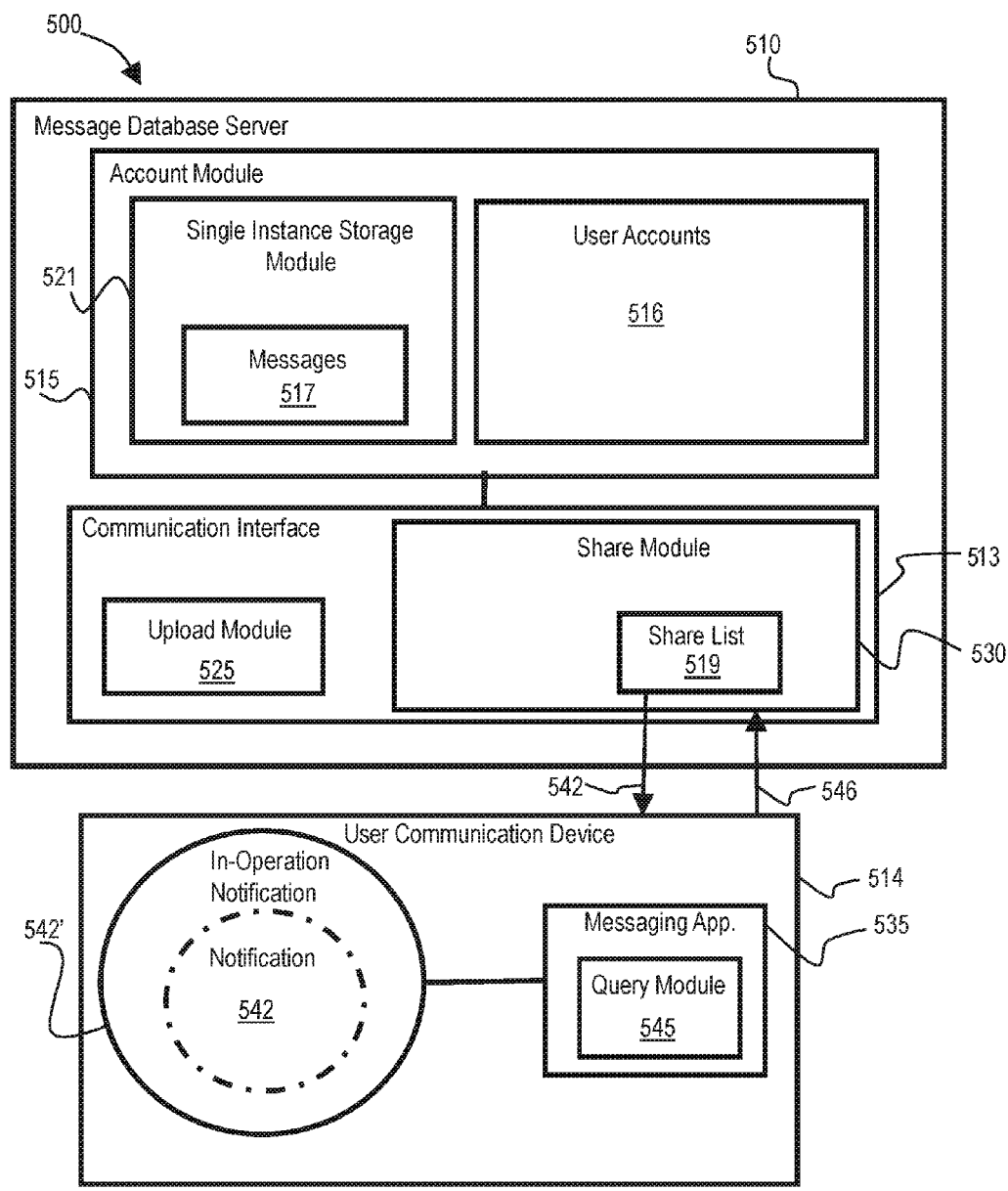
FIG. 5 is a schematic of a messaging system according to various embodiments described herein.

FIG. 5 schematically illustrates a further embodiment of a messaging system 500 wherein the messaging application 535 includes a query module 545. The messaging system 500 may include all or some of the features described above with respect to systems 100, 200, 300, 400 unless stated otherwise. Similar features are also identified with similar numbers. It is to be appreciated that while the query module 545 is illustrated to be associated with the messaging application 535 programmed or configured to be run on the user communication device 514, in some embodiments the messaging application 535 is configured to communicate with the query module 545 wherein the query module 545 is a component of the message database server 510, e.g., with the communication interface 513 and configured to query the share module 530, the single instance storage module 521, or user accounts 516. Upon being queried 546, the share module 530 of database server 510, e.g., a portion of the module configured to query for notifications 542, messages 517, or share lists 519 identifying the user account 516 associated with the user communication device 514 initiating the query 546, is configured to check the user account 516 being queried 546 against records or share lists 519 in the message database server 510. The messaging program 535 or the user account 516 may be configured to periodically or specifically query 546 the message database server 510. In one embodiment, the user may selectively initiate the query module 530 to query 546 the system 500 and may provide parameters, e.g., duration of availability of message 517, privilege level, newly added or modified, messages 517 authored by the user or another specified user, or other message characteristic, to limit the query to a defined set of messages. 517. If any messages 517 are available, the database server 510, e.g., via the share module 530 or an associated query or notification function, may provide notification 542 to alert the user of the message 517 in response to the query 546. In some embodiments, upon receiving the notification 542, messaging application may modify, translate, or morph the notification 542 for presentation of the notification 542' to the user, which may be obscured for interpretation by a specified user as described herein if query 546 was initiated by a background function. Upon receiving and properly interpreting the notification 542', to be notification 542 of an available message 517, the user specified may then access the database server 510 to view or act upon the message 517.

In various embodiments, the messaging application 535 installed on or simulated on the user communication device 514 may be used to communicate with the query module 545 to query 546 the message database server 510, e.g., the notification module 540 or user account 516, to check for notifications 542 or messages 517 identifying the user. In one embodiment, the query module 545 may provide references to notifications 542 or messages 517 which may route the user to a notification 442 in the user's account 416 or may provide access to the message 417, e.g., via the message access portal.

In one embodiment, the user may use the user communication device 514 to communicate with the message database server 510 and provide identifying information to log onto the message database server 510 or their account 516 to receive notifications 542. The notification 542 may prove a link that the user may follow to access via the message access portal of the share module 530 the message 517 stored as a single instance message 517 in the single instance storage module 521. Delivery of a message notification 542 to a second user may require that the second user login to the user's account 516. This may be done via the user messaging application 535 stored on the user communication device 514 or by using the user communication device 514 to access the account 516, e.g., through a network or website. For example, the second user may log onto the user messaging application 5335 installed on the user communication device 514. In some embodiments, the notification module may provide the notification 542 to the application 535 without the application 535 querying 542 via the querying module 545, e.g., when the user has identified the electronic address of the user communication device 514 for receiving notifications 542. The application 535 may then present the notification 542' to the user, e.g., according to a notification preference.

In some embodiments, the message database server 510 is not configured to provide notifications 542 directly to user communication devices 514, rather user communication devices 514 must initiate communication with the message database server 510 via the messaging application 535 to access a notification 542, e.g., notifications 542 may be delivered to the user account 516 or the user account 516 may be configured to query 546 the message database server 510 to check for message notifications 542, updates, or messages 517 available for access. In one embodiment, the user may use the user communication device 514 and messaging application 535 to initiate the query 546 or set preferences with respect to when the user account 516 or user application 535 initiates the query module 545 to query 546 the message database server 510.

In one embodiment, the messaging application 545 comprises a background program in which the user may initiate revelation of the prompt by performing an action. For example, the user may tap a sequence of images or menus or portion of a screen associated with the user communication device 514 to reveal the prompt. In one embodiment, the messaging application 545 may use an accelerometer or other positioning or orientation perceiving components associated with the user communication device 514 to define the action. For example, the user may tilt or orient the user communication device 514 in a predefined manner to reveal the prompt. In some embodiments, combinations of tapping and orientating may be used to reveal the prompt. In one embodiment, the user may define the actions that may be performed to reveal the prompt. For example, the user may define a particular sequence of actions configured to reveal the prompt. In one embodiment, the user may perform a series of touches or outlines, to, e.g., draw a shape or design that will reveal the prompt. Similarly, in one embodiment, a password may comprise a particular sequence of actions as described herein.

Figure 6:
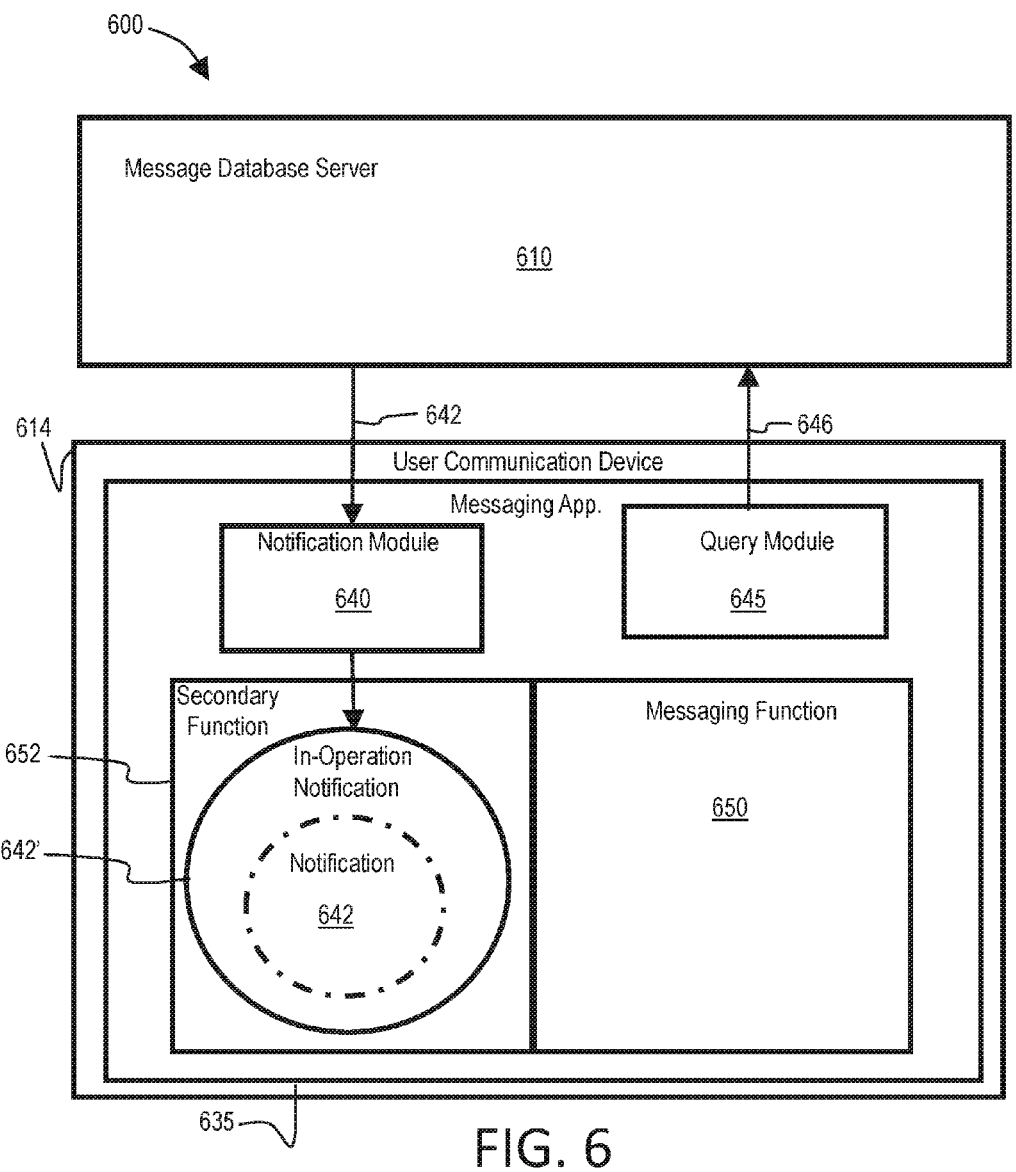
FIG. 6 is a schematic of a messaging system according to various embodiments described herein.

FIG. 6 schematically illustrates one embodiment of a messaging application 635 suitable for operation in the messaging systems described herein. The messaging application 635 comprises a primary messaging function 650 and a secondary function 652. The secondary function 652 is configured to appear as and otherwise function as an application or operation associated with the user communication device 614 that is not the messaging function 650. Typically the secondary function 652 is presented and operates as a typical or ubiquitous type application that would be expected to be on or associated with the user communication device 614, such as a map function, typical messaging function, settings or configurations, games, debugger, mobile applications, etc. The secondary function 652, however, may be integrated with the primary messaging function 650 of the messaging application 635 to, for example, provide notifications 642/642' to the user during operation of the secondary function 652. For example, the messaging application 635 may translate or morph a notification 642 of a message or message data details into a notification 642' that is obscured or presented in a cryptic manner, which may be defined in part by user preferences, that may otherwise be perceived as an in-operation event associated with the second function 652 or operation of the user communication device 614 or its associated functions that are unrelated to a message notification 642. The messaging application 635 includes a query module 645 to query 646 for messages, notifications 642, or to receive notifications 642 from the message database server 610, which may be similar to message database servers 110, 210, 310, 410, 510. The messaging application 635 also includes a notification module 640 configured to receive notifications 642 from the query module 635 or the message database server 610, e.g., from a share or notification module associated with the message database server 610, and to provide notifications 642/642' as provided in the preferences. When the notification module 640 provides notifications 642 while the messaging application is in a stand-by or secondary function mode, the notification module 640 is configured to present an in-operation or obscured notification 642' that obscures the true meaning of the notification 642. It is to be appreciated that in some embodiments, the messaging application does not include a query module or notification module and may be configured to communicate with a notification module or a query module associated with the database server 610. For example, in one embodiment, the messaging application 635 includes a notification module 640 configured to receive notifications 642 from a notification module associated with the database server 610 and present the notification 642 as an in-operation or obscure notification 642' associated with the secondary function 652.

In various embodiments, the notification 642' may comprise an event associated with the user communication device 614 or operation thereof, e.g., the secondary function 652. Upon receiving the notification 642, the user may log onto or otherwise access the user's account to view more details about the notification 642 or access the message via the message access portal of the share module. Thus, in one embodiment, notifications 642 may be sent to a user communication device 614 and presented to the user as a predefined and cryptic notification 642'. For example, the notification 642' may be presented in the secondary function 652 of the application 635 as a sound, display, image, vibration, movement, or other event, etc. that appears to be associated with the secondary function 652 in order to obscure the notification 642 so as to not indicate a new message but that an event related to the secondary function 652 is available or happened. In various embodiments, the events associated with the secondary function 652 used to provide cryptic notifications 642' may be customized by the user, e.g., via preferences associated with the user account.

As described in more detail below, the notification 642 may be obscured or cryptic such that only those able to decipher the notification 642' will realize that the notification 642 is present or the true nature of the notification 642'. In certain embodiments, notifications 642/642' may include additional details with respect to the message, such as identification of the first user, additional second users that may access the message, modification privileges, time period the message has been or will be available prior to deletion, number of modifications, etc. Notably, in some embodiments, such information may not be associated with the notification 642/642' or may be associated with a notification available upon accessing the user's account on the message database server 610. In some embodiments, the notification 642', which may include message details, may be presented in an encoded manner to obviate the notification or details. That is, the notification 642 or details may be presented in the notification 642' in a manner that the user may specify or decipher but which others that may perceive the notification 642' may not. While the secondary function 652 and messaging function 650 are typically tied within the same messaging application 635, the messaging application 635 could include a messaging function 650 and an integration function configured to integrate into an operation of the communication device 614 such that the operation integrated becomes the secondary function 652. Thus, in one embodiment, the messaging application comprises an integration function configured to hijack or morph a portion of another program, application, or operation to apply customized notifications through the hijacked program, application, or operation. Preferably, hijacking does not significantly impair the operation of the hijacked program, application, or operation.

Figure 7:
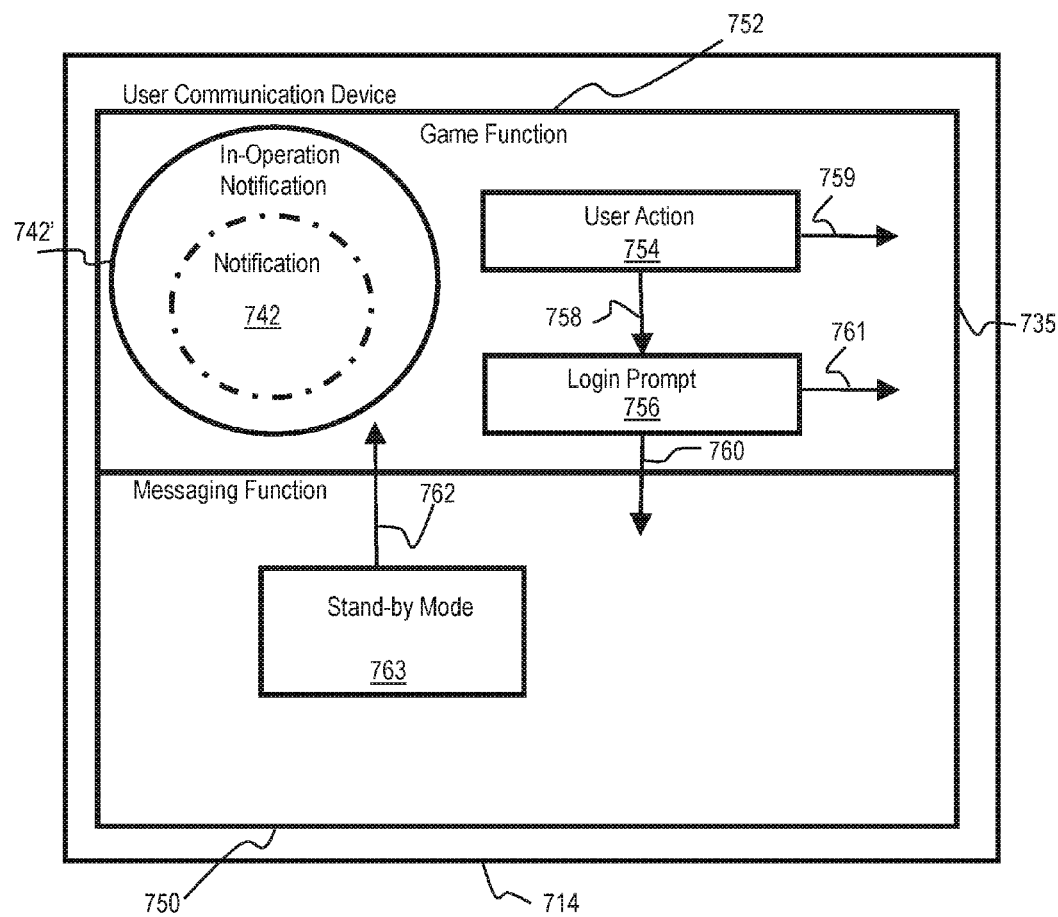
FIG. 7 is a schematic of a messaging application comprising a messaging function and a game function according to various embodiments described herein.

FIG. 7 schematically illustrates a messaging application 735 comprising a messaging function 750 and a game function 752. The game function 752 may comprise a secondary function that may be run on the user communication device 714 and that is configured to obscure the messaging function 750, e.g., the primary messaging function. For example, in one embodiment, the messaging application 735 may be integrated into a game application that may be run on a user communication device 714.

Within the game function 752 and upon a user action 754 the application 735 may be configured to present a login prompt 756. Depending on the configuration or preferences, the user action 754 may include opening or initiating the game function 752, performing a sequence of actions as described herein, and which may or may not be after an in-game notification 742' has been presented, which in some embodiments may change the actions 754 that must be performed to present the prompt 756. When the user performs the user action 454 correctly 458 the login prompt 756 is presented. When the user action 754 is not performed or performed incorrectly 759, the messaging application 759 remains in the game function 752. The login prompt 756 may be presented to a user to request that the user provide identifying information, such as a username or password associated with a user account, to provide access to the user messaging account. The prompt 756 may be generic in that it does not identify the messaging application 735 or may be disguised as a prompt for another application or privilege. If the user provides the correct identifying information 760 at the prompt 756, the messaging application 735 displays or enters the messaging function 750 wherein the user may perform the messaging operations such as accessing the message database server and the user account. If the user is unable to provide the correct identifying information 761 at the prompt 756, the prompt 756 may disappear and the game function 752 may continue. Thus, if the user provides identifying information associated with a user account, which may be linked to the application or the message database server, the messaging function 750 will appear and be fully functional.

The prompt 756 may be configured to appear or be revealed at one or more predetermined times such as upon initialization of the application, after a first period of time following initialization, or periodically. In one embodiment, the prompt 756 is configured to appear with respect to the game operation, e.g., when a level has been passed or upon performing another user action 754 or operation related to the secondary function 752, such as initiating and then pausing a song in an embodiment wherein the secondary function comprises a music function or initiating a clean in an embodiment wherein the secondary function comprises a debugging function. In one embodiment, the prompt 756 is configured to appear after the user has manipulated a user interface such as one or more buttons, touch, menus, clicks, etc. in a specified manner. For example, a user action 754 may comprise the user correctly performing 760 a sequence or series of clicks, taps, or orientations of the user communication device 714 to reveal the prompt 756. In another embodiment, the user may initiate an operation or perform an action related to the secondary function to reveal the prompt 756.

In one embodiment, the user may exit 762 the messaging function 750 by initiating a stand-by mode 763 with respect to the messaging application 735. For example, the user may tap a user interface such as a touch screen or button at which time the messaging application 735 or messaging function 750 may disappear from the screen. In one embodiment, exiting 762 or entering stand-by mode 763 will return the messaging application 735 to the game function 752 that the user previously initiated. In some embodiments, while the messaging function 750 of the messaging application 735 exits 763 to stand-by mode 763 or game function 752, the messaging application 735 may periodically query message database server, e.g., via communication with the query module, for notifications regarding an available message or if a message is available. The query module may query the notification module for a notification or additional notification details. When a notification of a message is available, the messaging application 735 may provide a notification 742' to the user as described above.

Thus, the messaging system may include a messaging application 735 comprising a messaging function 750 cloaked in a video or game function 752. The messaging application 735 is configured to cloak the messaging function 750 and notifications 742' such that unintended recipient are not aware of the messaging function 750 or the true meaning of the notification 742' or even that a notification 742' is a notification. Thus, some of the messaging functions 750 may be integrated into the game functions 752 to therefore utilize, for example, a fully functional mobile game application in order to obscure the primary messaging functions of the messaging application 735. In one embodiment, within the game function 752 of the functional game of the messaging application 735, performing a user action 754 comprising correctly 758 tapping a series of menus will reveal a login prompt 756. Upon entering an incorrect 761 username or password, the prompt 756 may disappear and the game function 752 of the application may continue to function. But when a correct 760 username and password combination is entered, the messaging functions 750 of the application 735 appear and are fully functional.

In one embodiment, when the user taps or clicks a stand-by or log off button 763, the messaging function 750 disappears and the user may then return to the game function 752 of the messaging application 735 that the user started with. While in stand-by mode 763 the messaging functions may periodically query the database server for a message or notification. These messaging functions 750 may perform the querying in the background while the game function 752 or other device operation is on-going. Thus, the user of the communication device 714 may be unaware of the query operations. When a message is available, an in-game notification 742' will be presented, e.g., a sound and/or vibration will occur. Unless the user is the intended recipient, the user may not perceive or be able to decipher that the in-game notification 742' is a notification of a message and may assume the in-game notification 742', e.g., a sound, display, image, vibration, movement, or other event, etc., is simply a notification of a game event or the occurrence of a game event. Thus, the in-game notification 742' may be designed to be obscured so as to not indicate a new message but rather that a game event is available or happened. In various embodiments, in-game notifications 742' may be customized by the user. For example, a user may specify game events to be used as in-game notifications 742' to, for example, indicate which author uploaded the message. The type of game events used for in-game notifications 742' may further be customizable by the user to provide notification details. For example, an in-game notification 742' may be a background, theme, or image change that indicates that a message from a specific first user or generic first user is accessible by the user. Other details, such as time the message is available, modification privileges, etc. may similarly be presented in the in-game notifications 742'. In various embodiments, the in-game notifications 742' may comprise sounds such as songs, beats, phrases, music, or chimes, themes, background images or scenery, bonus points, extra lives, appearance or availability of additional features, e.g., power-up available, perspective or view change, character or image changes, e.g., game character changes size, color, or appearance, performance change, e.g., character can run faster, fly, see through walls, or throw fire, increased options, e.g., new weapons are available, a game character appears or performs an identifiable action, e.g., character spins, dances, or an antagonist or assistant appears. In one embodiment, a new level or portal to a new or different level or stage appears in which selection or attempt to enter the level reveals to the prompt 756 to access the messaging function 752 where the message may be accessed. As above, if the incorrect 761 identifying information is entered, the user will return to the game function 752, however, depending on the embodiment, the user may not be able to advance to the new or additional level. This may further disguise the prompt 756.

Figure 8A:
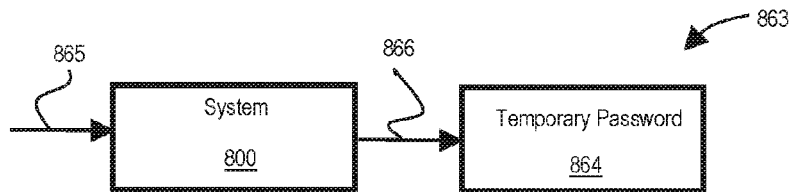
FIGS. 8A-8C schematically illustrate portions of a password reset function 863 according to various embodiments described herein.
Figure 8B:
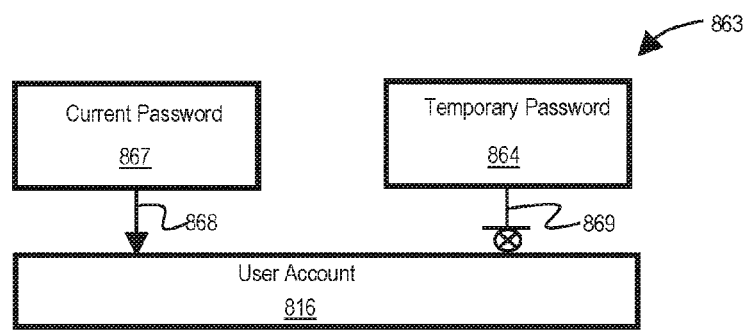
Figure 8C:
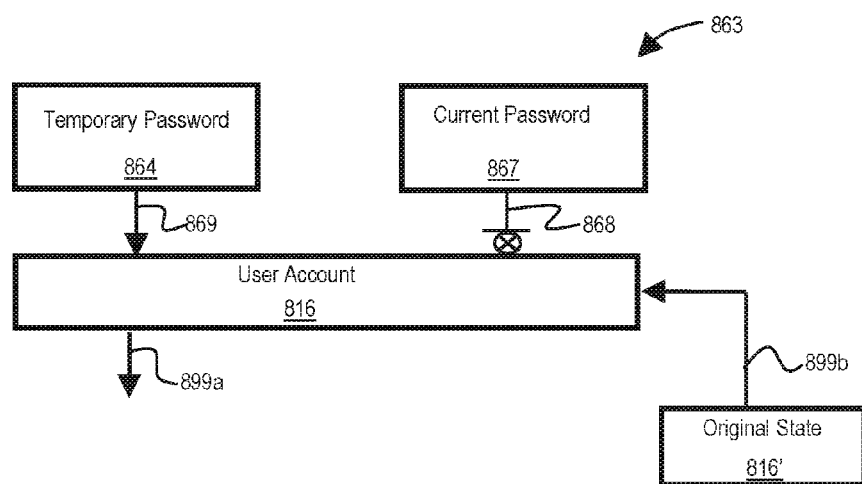

FIGS. 8A-8C schematically illustrate portions of a password reset function 863 according to various embodiments. The password reset function 863 may enable a user to reset a password associated with the user account using a temporary password 864, e.g., if the user has forgotten the current password 867 or if the user believes the current password 867 may be compromised. In FIG. 8A, the user initiates the password reset function 863 by submitting a request 865 to the system 800. The system 800 responds by providing 866 a temporary password 864. In this embodiment, the existence of the temporary password 864 does not terminate authenticity or functionality of the current password 867, as shown in FIG. 8B. Thus, the current password 867 remains operative to access the user account when the user attempts to log into 868 the user account 816. However, in one embodiment, by entering the current password 867 to log into 868 the user account 816 before using the temporary password 864 to log into 869 the user account 816 will invalidate the temporary password 864 such that the temporary password 864 may not be used to log into 869 the user account 816. As shown in FIG. 8C, if the user uses the temporary password 864 to log into 869 the user account 816 before the user uses the current password 867 to log into 868 the user account 816, the temporary password 864 is invalidated and the system 800 is configured to revert 899*b* the user account 816 to an original state 816', e.g., all personalized or customized settings or preferences and information are deleted 899*a* and may not be recovered.

In various embodiments, the communication interface of the message database server includes a network interface, web page, or website that may be used to interface with the message database server. The communication interface may include a static or dynamic web page configured to interface with a user communication device, e.g., with a browser or application, which in some embodiments may be associated with or include the user messaging application. A user or prospective user may access the web page via the user communication device. The user communication device may include the user messaging application, which may be provided in various forms, such as a mobile application or personal computer application that may include browser functionalities. In one embodiment, the user may download the user messaging application onto the user communication device directly from the web page, online store, or a tangible storage medium. In one embodiment, the user messaging application may be available for virtual operation on the user communication device through the communication interface of the message database server.

Figure 9:
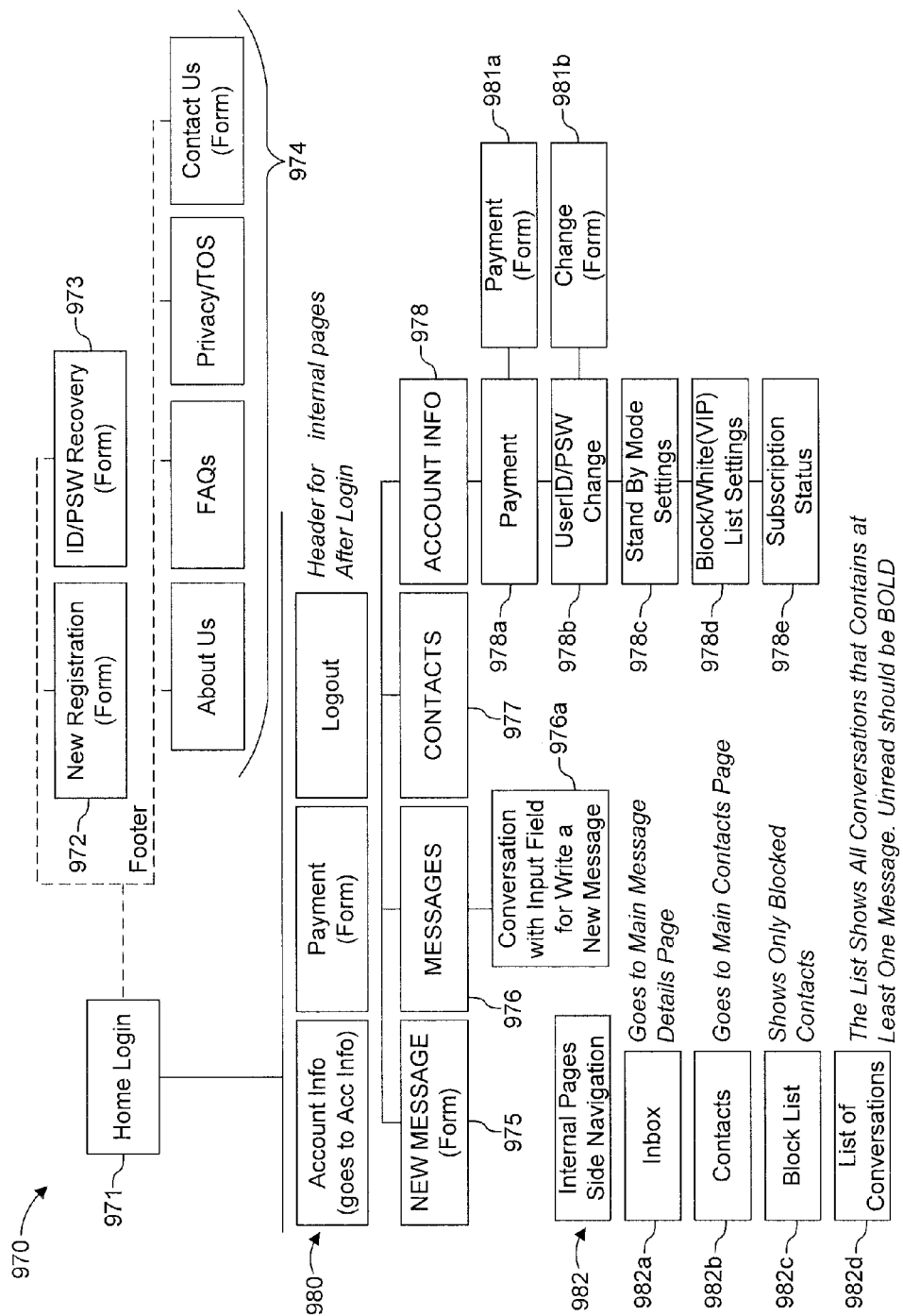
FIG. 9 is a navigation diagram of a website interface for messaging program according to various embodiments described herein.

FIG. 9 is a navigation diagram of a website interface 970 for use with the messaging system according to various embodiments. The website 970 includes a navigable collection of pages that may be accessed and displayed on the user communication device for interfacing with the message database server. Initially, a user or potential user may access a login or home page 971 including a graphical user interface. At the login page 971, the user may sign up for an account by selecting a registration link 972. When the registration link 972 is selected, the user may be provided with a registration form. The user may be required to complete portions of the form to initiate or complete registration. Once registered, a user account may be created for the user. When creating a user account, the messaging system may assign or request account identification or access data from the user. For example, the user may be required to create or select a username and password that is to be provided upon login 971 or at the login prompt as described above. In some embodiments, the user may further or optionally provide a physical or electronic address, such as an email address. The address may allow recovery of forgotten passwords or usernames, e.g., allowing the user to receive a temporary password upon request. Thus, in some instances, the absence of an address or other route of contact or verification may prevent recovery of forgotten passwords or usernames. In one embodiment, a user that has forgotten a password may select the recovery link 973 on the login page 971 wherein the user will be presented with a recovery form for completion. For example, the user may request that the message database server send a temporary password to an email address, if one was previously provided or on file. In some embodiments, the absence of an email address record prevents resetting of the password. In one embodiment, the recovery form may include fields for username or email address. If the username is found with an email address on file then a temporary password will be sent. In one embodiment, if the provided email address is found on file, the username and a temporary password may be sent. If the username is found without an email address on file, no temporary password will be sent. In various embodiments, additional measures may be taken to prevent those having unauthorized access to a user's email account from obtaining access to the user's identifying information to access the account. For example, the user may be required to answer one or more pre-determined challenge questions to recover a password. In some embodiments, if a temporary password is used, the user's account is reverted to its original state and all messages and contacts are deleted from the user's account. In various embodiments, the login page 971 includes various informative links 974 descriptive of the website and its policies such as an about link, a frequently asked questions link, or a privacy or terms of services link and a contact link wherein the user may complete a contact form to contact site administrators, owners, or the like.

When the user has successfully logged onto the website, the user may access various aspects of their account by navigating one or more web pages. Once logged into the system, the user may link with a new message form 975 into which a new message may be composed, a message details page 976 to view messages and link to a conversation page 976*a*, a contacts page or address book 977 to view contacts, or an account information or settings page 978. The account information or settings page 978 includes a payment section 978a having a payment form 981a. The account information or settings page 978 also includes a change UserID/password section 978b requiring the user to complete a change form 981b. In some instances, the change UserID/password section 978b may include a link to the payment section 978a requiring the user to complete the payment form 981a for processing the change UserID/password. The account information or settings page 978 also includes a stand-by mode setting section 978c for providing preferences and settings for stand-by mode. The account information or settings page 978 also includes a block/white (VIP) list settings section 978d allowing the user to customize their address book or contacts by blocking or blacklisting users in which the user has blocked messaging. Similarly, the block/white (VIP) list settings section 978d allows the user to identify white list or VIP users that enjoy preference. Such VIP users may be assigned different notifications, priority listings in the contacts and messages pages, or other preferential status allowing the user to receive and respond efficiently to messages from the listed VIP users. The account information or settings page 978 also includes a subscription status section 978e allowing the user to view subscription status, receive special offers for update, renewing, or upgrading their current subscription. In some embodiments, subscription histories may also be available including past reversions of their account to its original state as well as limited recovery points to recover previous account settings prior to changes initiated by the user. Links 980 are also provided in the internal pages for quick access to the account information page 978, payment forms 981, and logging out 972. Links for side navigation to internal pages 982 may include an inbox link 982a that directs to the message details page 976, a contacts link 982b that directs to the contacts or address book page 977, a block list link 982c that directs to contacts or address book page filtered to show only blocked or blacklisted contacts, and a list of conversations link 982d that directs to a page listing all conversations that contain at least one message.

Figure 10:
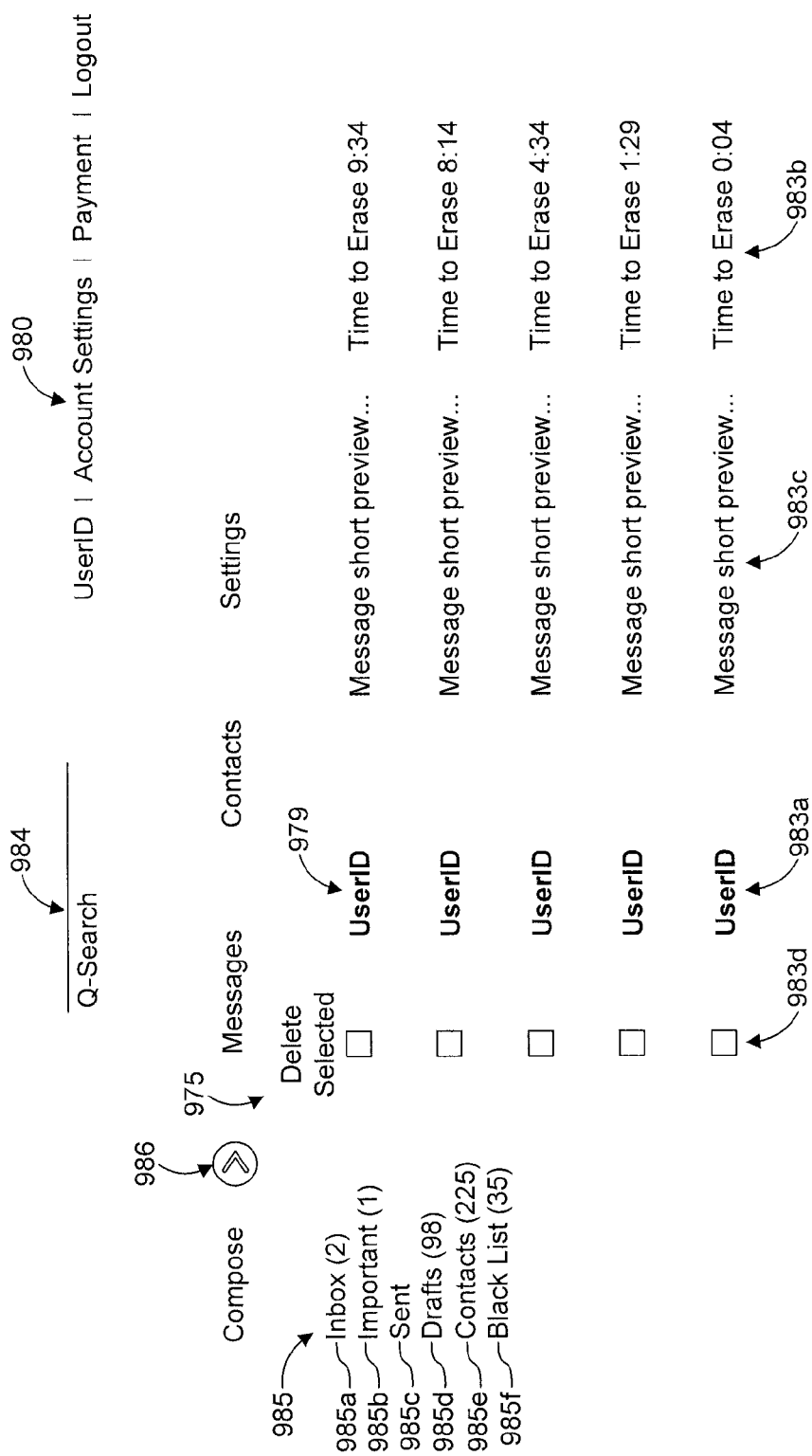
FIG. 10 illustrates features of a message details page according to various embodiments described herein.

FIG. 10 illustrates features of a message details page 976 according to various embodiments. The message details page 976 provides a view of messages which the user is authorized to access. In some embodiments, the messages may be sortable by the UserID of the author or users authorized to view the message in the first column 983a, the date created, last edited, most recently viewed, unviewed, pending, or by date specified for being deleted 983b in the third column, for example. A short preview of the message is provided in the second column 983c. In various embodiments, unread messages may be indicated by a bold or conspicuous type formatting. Messages may also be deleted from the message page 979 by selecting a box 983d adjacent to the message to mark for the message for deletion. Selecting a message takes the user to the message or conversation page 976a specific for the message and includes the message and related conversations. The conversation page 976a also includes an input field for writing a new message. Links 980 are also provided at the top of the message page 979 for quick access to the account information page 978, payment forms 981, and logging out 972. A search box 984 is also provided at the top of the page to allow the user to search their account or the website 970. Side navigation links 985 are provided to provide quick links including an inbox link 985a, an important messages link 985b, a sent messages link 985c, a draft message link 985d, a contacts link 985e that directs to the contacts or address book page 977, and a black list link 982f that directs to contacts or address book page filtered to show only blocked or blacklisted contacts. A compose link 986 is also provided to direct the user to a new message form 975 from which a new message may be composed.

Figure 11:
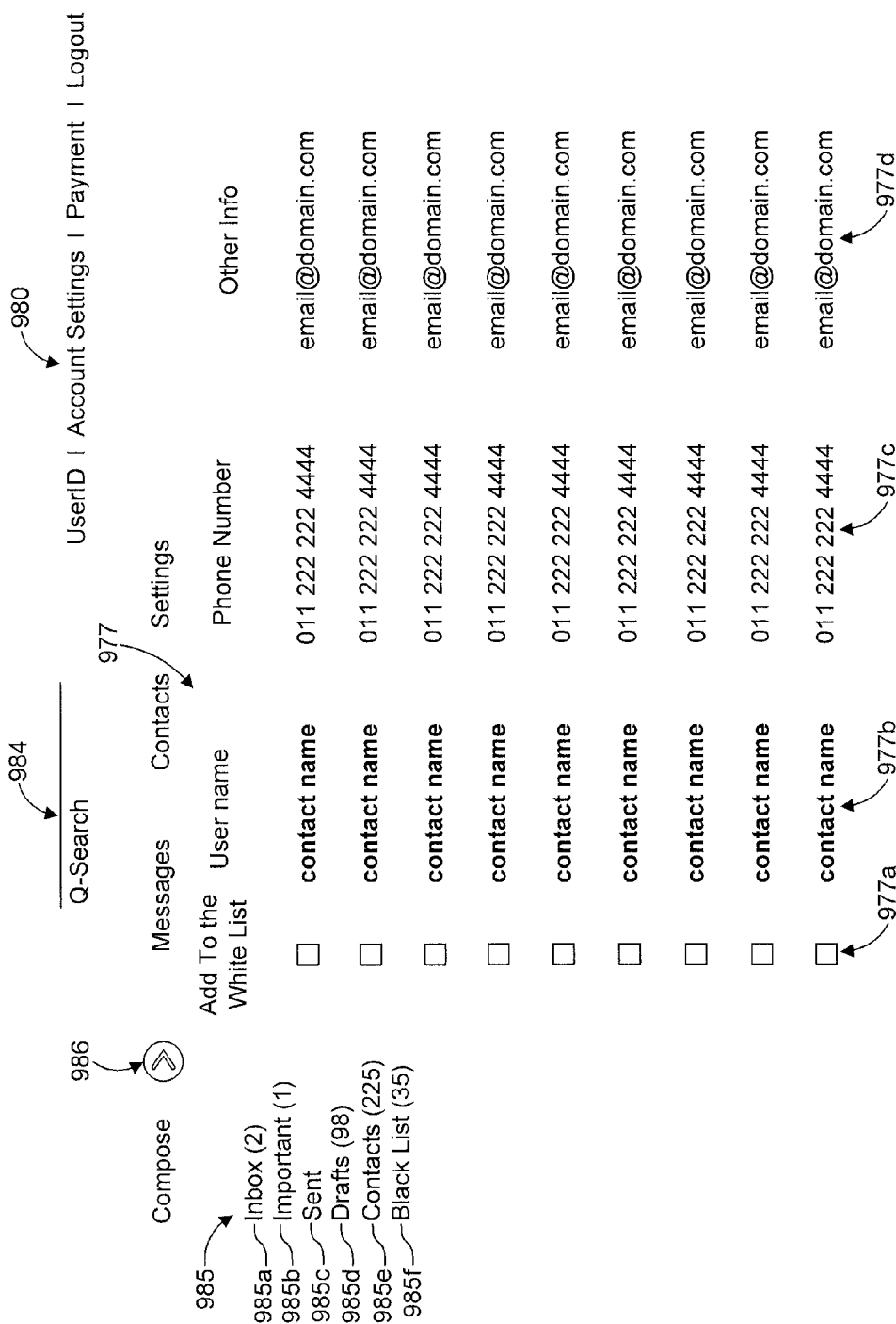
FIG. 11 illustrates features of a contacts page according to various embodiments described herein.

FIG. 11 illustrates features of a contacts page 977 according to various embodiments. The contacts page 977 provides a view of the user's contacts. In some embodiments, the contacts may be sortable by the contact name or UserID in the first column 977b alphabetically or by a rating system that the user may use to prioritize their contacts, e.g., favorite, date added, groups, subscription level, most used, etc. The second column 977c provides contact information such as a phone number. The third column 977d is available for other information related to the contact such as comments, number of messages open, notes, or whatever the user chooses to use the column 977d for. In this instance, the user has chosen to use the third column for email addresses. In some embodiments, the contacts page 977 may include customizable features allowing the user to add additional columns for information that may allow the user to quickly and accurately sort through the contacts. Contacts may be removed or added to the white or VIP list and in some instances removed or added to the black or block list by selecting a box 977a adjacent to the contact to mark the promotion or demotion of the contact. In one embodiment, addition or removal from one contacts list may initiate an optional notification to the contact of the change. In one instance, the notification may include removing the first user from the contacts page 977 of second users in which the first user has blacklisted. In another embodiment, the notification may include highlighting or presenting the first user in a conspicuous color or font in the second user's contacts page 977. Links 980 are also provided at the top of the message page 979 for quick access to the account information page 978, payment forms 981, and logging out 972. A search box 984 is also provided at the top of the page to allow the user to search their account or the website 970. Side navigation links 985 are provided to provide quick links including an inbox link 985a, an important messages link 985b, a sent messages link 985c, a draft message link 985d, a contacts link 985e that directs to the contacts or address book page 977, and a black list link 982f that directs to contacts or address book page filtered to show only blocked or blacklisted contacts. A compose link 986 is also provided to direct the user to a new message form 975 from which a new message may be composed.

Figure 12:
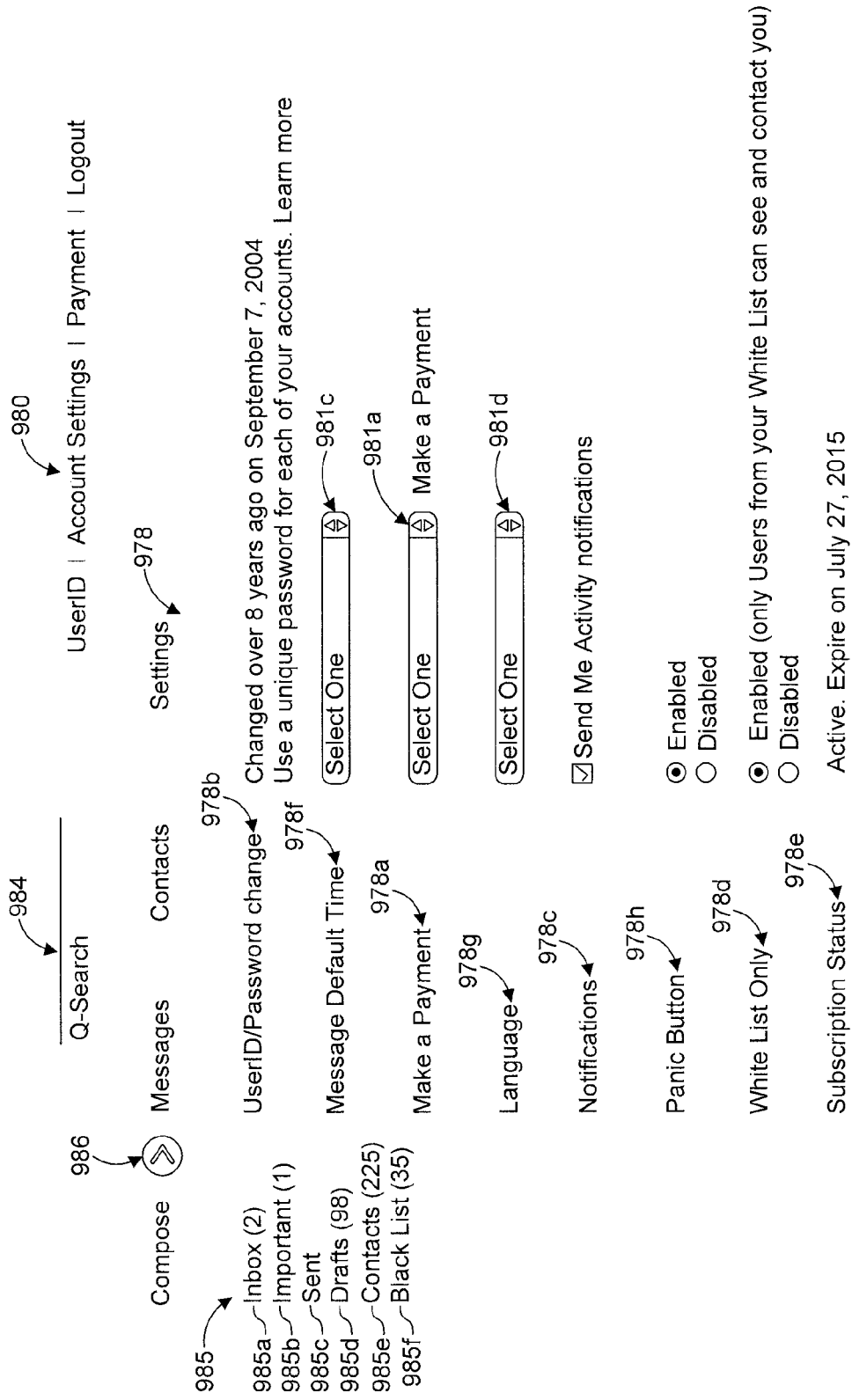
FIG. 12 illustrates features of an account information or settings page according to various embodiments described herein.

FIG. 12 illustrates features of an account information or settings page 978 according to various embodiments. The account information or settings page 978 includes the change UserID/password section 978b. This section may provide information regarding the strength of the current password or a history of the current password or previous passwords. If the user wishes to change their ID or password, the user may be directed to a change form 981b in which to request the change. In some embodiments, the change UserID/password section 978b may include a link to the payment section 978a requiring the user to complete the payment form 981a for processing the request to change their user ID. Preferably a fee processed through the payment forms 981a is required for changing username/userID, however, changes to passwords are typically not accompanied by a fee. In some embodiments, changing a user ID updates instances of the user ID in the contact listings of other users. The account information or settings page 978 also includes a default time section 978f for specifying a default time at dropdown menu 981c and default language section 978g selectable in dropdown menu 981d. In certain embodiments, selecting a default language initiates a translation services, such as a machine translation service, for translation of messages into the selected default language. Thus, the system may allow users that speak different languages to exchange messages using different default languages. The payment section 978a allows the user to make payments related to their account, e.g., payments for their subscription or to other users. A dropdown menu 981a may be used to identify the correct type of payment and form. The account information or settings page 978 also includes the stand-by mode setting section 978c for providing preferences and settings notifications in stand-by mode. Here, the user has chosen to receive activity notifications. In some embodiments, the website may further allow the user to select messaging application notification preferences when the application is linked to the account. Alternately, the messaging application may retain preferences with respect to in-operation notifications and related customizations. The user is also provided with a panic button section 978h allowing the user to disable or enable a panic button feature when the user account is configured with a messaging application that the system identifies with the user, e.g., by a device or application ID. The account information or settings page 978 also includes the block/white (VIP) list settings section 978d allowing the user to enable or disable white list only to allow only users from the user's white list to see the user as a contact and be able to contact the user. The account information or settings page 978 also includes the subscription status section 978e allowing the user to view subscription status. Links 980 are also provided at the top of the message page 979 for quick access to the account information page 978, payment forms 981, and logging out 972. A search box 984 is also provided at the top of the page to allow the user to search their account or the website 970. Side navigation links 985 are provided to provide quick links including an inbox link 985a, an important messages link 985b, a sent messages link 985c, a draft message link 985d, a contacts link 985e that directs to the contacts or address book page 977, and a black list link 982f that directs to contacts or address book page filtered to show only blocked or blacklisted contacts. A compose link 986 is also provided to direct the user to a new message form 975 from which a new message may be composed.

According to various embodiments, the website 970 includes a mobile device website requiring simplified rendering and processing to allow users to access the service in a mobile friendly environment using a mobile device, e.g., Android/iOS systems. The user may access the mobile website version by logging in at the login page 971 by providing a username and password. When the user has successfully logged onto the mobile website, the user may access the messaging details page 976 to select messages to read, send, or delete message. The user may also access their account contacts in their address book 977 to perform updates to their contacts including inserting, updating, and deleting contacts. The user may also update or modify their block list available through block list link 985f to insert new blocked contacts or update or delete blocked contacts. The user may also access their account information and settings 978 to update or modify their account settings. In various embodiments, the user may change their password using the UserID/Password section 978b, preferably for a fee processed through the payment forms 981a. The user may also change their password, which typically is not accompanied by a fee. The user may also update or delete their contact or other identifying information or review past and currently processing payments.

Figure 13:
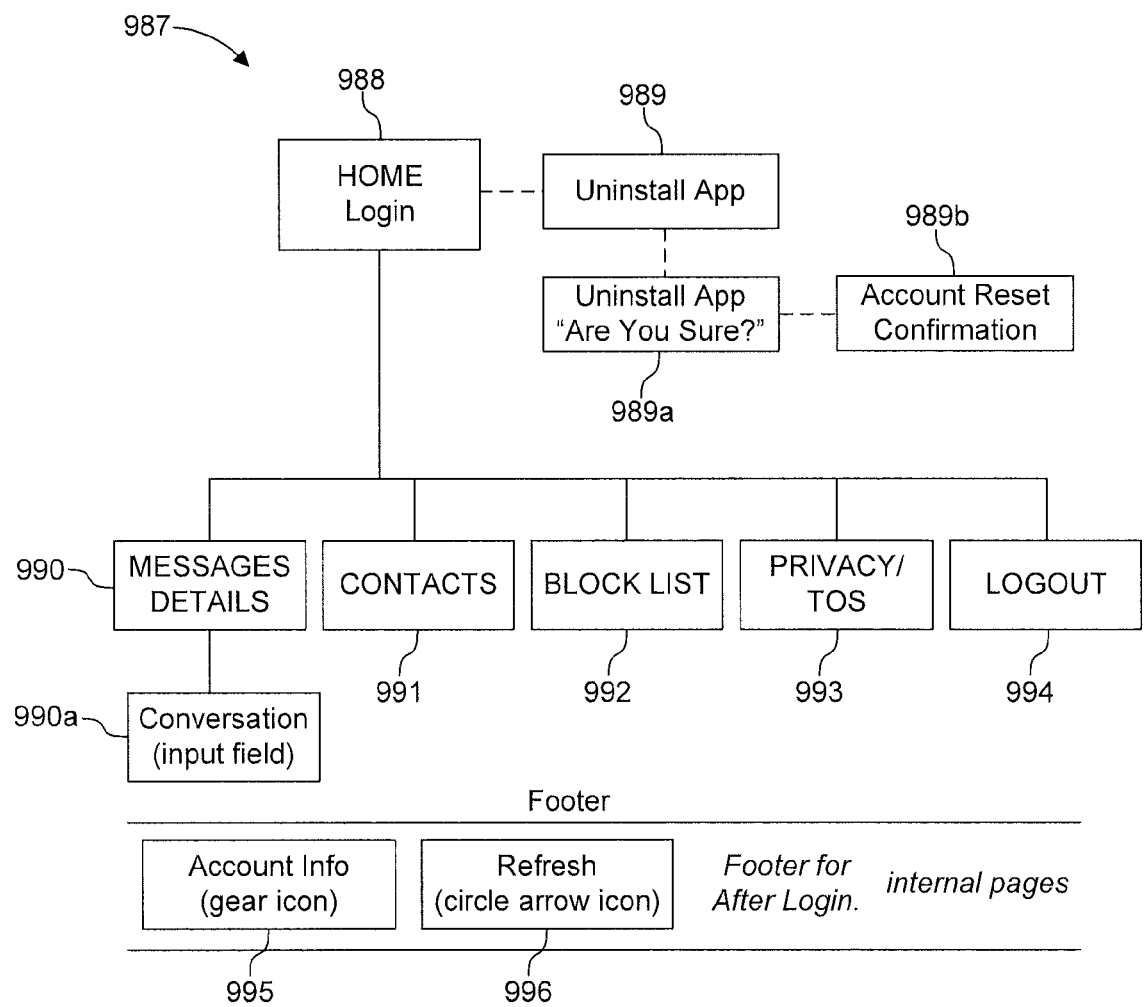
FIG. 13 is a navigation diagram of a messaging function or portion 987 of a messaging application according to various embodiments described herein.

FIG. 13 is a navigation diagram of a messaging function or portion 987 of a messaging application according to various embodiments. As described above, the messaging application preferably includes a secondary function such as a game function or integration configured to obscure various messaging functions of the messaging portion. The messaging application may be configured for user communications devices such as mobile phones, tablets, PDAs, personal computers. The messaging function 987 is associated with a mobile messaging application. The messaging function 987 includes a logon section 988. The logon section 988 includes a quick uninstall or panic button 989 that allows the user to uninstall the messaging application from the user communication device. In one embodiment, the user does not need to be logged into the messaging portion 987 or the messaging application in order to uninstall the application. In one embodiment, when the panic button 989 is triggered, the application uninstalled such that removal of the application may be accomplished with one click. In the navigation diagram 987, when the panic button 989 is triggered, the user is prompted 989a to confirm that the application should be removed. If the user confirms, the messaging application is removed from the user communication device. Confirmation of successful removal of the messaging application from the user communication device may also be confirmed 989b.

At the login section 988 the user is required to enter their username and password to access the messaging portion 987. In various embodiments, when the user has previously logged into the messaging function, e.g., the messaging application is in stand-by mode, the user may be required to only enter a password. However, in one embodiment, if the user enters an incorrect password, the user is required to enter a correct username and password to login. When the user has successfully logged into the messaging portion 987, the user may access a message details section 990 which may be similar to message page 976, a contacts section 991 which may be similar to contacts page 977 and may include a conversation input field section 990a similar to the conversation with input field 976a, a block list section 992 to display only blocked contacts, a privacy/terms of service section 993, and a logout section 994. The messaging section may also include an account information or settings link 995 to link the user with an account information or settings section. In the messaging details section 987 the user may read, send, and delete messages as well as draft messages or conversations 990a. In the contacts section 991 the user may insert, update, and delete contacts. In the block list section 992, the user may insert, update, and delete their block list. In the account information or setting section available through the account information and settings link 995 may be similar to account information and settings page 978 allowing the user to change the username/userID associated with the account, e.g., for a fee, change the account password, or change or remove identifying information such as an email address. The user may similarly modify and define stand-by settings. After completing desired messaging activities, the user may logoff the messaging portion 987 of the messaging application or enter stand-by mode. In one embodiment, the messaging application provides a link to the mobile website that, when clicked by the user, opens the mobile browser of the user communication device and links the user communication device to the mobile website.

The user may also indicate that their password has been lost or request a temporary password at the login section 988 or login page 971 of the website. A password reset function may include sending the user a temporary password, e.g., to an email account, if one was provided with the user account. In no email is associated with the user account on file, the password may not be available to be reset. After the temporary password has been sent, the user's old password may still be fully functional. However, logging into the user's account with the old password will invalidate the temporary password that was requested. If the user uses the temporary password before the temporary password is invalidated, the users account will revert back to the original state. For example, in one embodiment, all messages and contacts are deleted when a temporary password is used to access a user account. In some embodiments, the deleted data is unrecoverable. In one embodiment, a user may also change a username or even their userID with their user account at any time. For example, when the userID and username are dissociated, either may be changed without changing the other. When the userID and username are the same, changing the username may or may not change the userID, which may be given as a choice to the user when requesting or executing a change. If the userID is changed, the userID may also be changed to the updated or new userID in all the address books and block lists of other user accounts including the old userID.

In various embodiments, the user messaging application may be configured to run continuously or substantially continuously in the background of the user communication device. The continuous operation may be for a pre-defined period of time that may include periodic continuous operation that may or may not be determined by another operation of the user communication device or operation of the user messaging application. For example, the user messaging application may be configured to run in stand-by as a background process for 24 hours without activity after the user chooses a stand-by option. During the stand-by period, the user messaging application may be configured to periodically communicate with the message database server via the communication interface for new messages. In various embodiments, the user may configure the intervals wherein messages are checked. For example, the user may provide a preference in the settings interface page from a dropdown menu or in a field. For instance, the user may define intervals of once every 1 to 15 minutes or other interval. Such intervals may be variable or variable with respect to time of day or week. For example, the user may want the application to check for messages more often at peak times and less often during non-peak times. In one embodiment, the application interface may include a quick refresh, message check, half-time, double-time, or other time button whereby the user may quickly check or increase or decrease check intervals.

In one embodiment, if the number of messages is greater than zero, the user messaging application will notify the user of the new message, e.g., with an identifiable icon in a notification bar, graphic, sound, or pop-up ad, which may be disguised as an in-operation event associated with operation of the user communication device or another application. For example, a notification of a new message while in stand-by may include a message delivered from a pseudo text messaging account or application wherein the true nature of the notification is disguised in the message as an innocuous greeting or phrase.

In various embodiments, when the user may choose to completely logout or turn off the message check operation. For example, the user may select the logoff button to completely logoff such that the user messaging application will not check for messages until the user logs back onto the message database server, which may be through the user messaging application.

The user messaging application may be configured with shorter check intervals when the user is actively using the application, which may include using the messaging or secondary operations, such as a gaining portion of the user messaging application. For example, in one embodiment, when the user is actively using the application the application may be configured to check for new messages every 10 seconds and notify the user as described herein when new messages is greater than zero.

In various embodiments, the user may draft, read, view, edit, or delete messages through the messaging application. Messages may include various communication formats including text, video, sound, photographs, multi-media, etc. In some embodiments, notifications may be sent when a new message is available to be viewed. In one embodiment, the author or, in some instances, other users via their account may receive an accounting of prior messaging views. For example, the author of a message may be presented with a read receipt linked to the message in their account when one or more users, such as a particular user the author specified or any or all users listed in the share list have viewed the message.

As described above, in various embodiments, while a user account may be linked with a user device via an application or address, for example, the user must first log into the application or their account with user identification data to authorize or begin receiving notifications. For example, a user may log into the application via the user device having the application, which in one embodiment may be any user device having the application, or onto a designated website or server configured to run the messaging program. The user may then log out of the application or their account or place the application in a stand-by mode such that notifications may be received on the user device having the application authorized to their account in stand-by mode. The user may also log out of the application while terminating authorization to receive notifications associated with their user account on the user device until a later time upon logging into or reauthorizing notifications to be received to an application or user device. Thus, in one embodiment, the user may use one of a number of user devices to access their user account and receive notifications by logging into their user account via the messaging application or website.

In various embodiments, whatever user device the user is logged into in an active or stand-by mode may enable notifications to be received by the user device, e.g., logging into the user account via a user device may authorized that user device to receive notifications for the user until the user logs out or after a period of time, which in some instances may be selected at log in. For example, a user using a user device that others use may choose to indicate that their account should automatically log out from active or stand-by after an hour or other indicated time. In various embodiments, the database server is configured to identify user accounts within the system by unique identifying numbers that users may never see. In one embodiment, the users may only see username and/or nicknames associated with their account.

In one embodiment, login has three phases or modes. In a first mode, the login is active. In this state, the user may access the user account via the application or website to perform the various messaging operations. The access may be complete account access for performing messaging operations. In a second mode, login is passive or on stand-by. For example, to enter stand-by the user may press a stand-by button or application inactivity. The this mode, the user may be able to receive notifications associated with their user account via the application or website to their user device, e.g., notifications of new messages. In one embodiment, when in stand-by mode, a user may receive a notification of a new message and then attempt to enter the application or their user account to read the new message. In one instance, the user will be required to enter a password associated with their account when clicking on a notification, for example. If the user is unable to enter the correct password, the application or the user account may prevent the user from accessing the associated user account or view the message. In one embodiment, where the application is associated with a game, the application may return to the game. In some instances, the application may transition to a third mode or logged out mode, which will require that the user enter a username/password combination to reauthorize access to the user account. Thus, in one embodiment, a third mode includes a logged out mode, in which the previous authorizations with respect to the application, receiving of notifications to the user device or application are revoked such that access to the user account or notifications requires that the user enter the first mode by entering a username/password combination to access messaging and notification aspects of the user account or application.

In various embodiment, the application may be configured to query the database while in stand-by mode at various intervals. In one embodiment, the application queries the database server anywhere from 1 to 15 minutes, however, other query intervals may be used. The query intervals may be user configurable. While using the application or game, for example, the application may be configured to query the database server every 10 seconds.

In one embodiment, notifications may be presented in a game setting, as described above. The notifications may be disguised as in-game events. In one embodiment, a photo application may be used to receive notifications. For example, a particular gesture in a photos may indicate a message. In one embodiment, the application may include a photo application in which gestures, backgrounds, attire, or images may be manipulated by touching a user interphase. For example, notifications may be linked to a particular change that occurs to the photograph upon manipulating the photo. In this or another embodiment, logging into or presentation of the password to receive a notification may be linked to a photo application such that by touching or sliding a finger across a series of points within a photo the application can become active, e.g., transitioned from stand-by to active mode.

In various embodiments, the user messaging application and the messaging program are configured such that no message are to be saved to a user communication device hard drive, permanent or secondary storage medium but rather will exist in temporary, volatile, or RAM.

The programs and applications described herein may include instructions such as software stored on machine-readable medium embodying any one or more of the methodologies or functions described herein. The instructions may also reside, completely or at least partially, within the main memory, the static memory, or within a processor, or a combination thereof, during execution thereof by the system or component thereof, such as the message database server. Dedicated hardware implementations including, but not limited to, application specific integrated circuits, programmable logic arrays and other hardware devices can likewise be constructed to implement the systems described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example systems are applicable to software, firmware, and hardware implementations. Furthermore, software implementations can include, but not limited to, distributed processing or component/object distributed processing, parallel processing, or virtual machine processing can also be constructed to implement the methods described herein. The database server may generally include a machine-readable medium. While the database server is generally describe singly, it should be taken to include a single medium or multiple media (e.g., a centralized or distributed database, and/or associated caches and servers) that store the one or more sets of instructions. The term "machine-readable medium" shall also be taken to include any medium or device that is capable of storing, encoding or carrying a set of instructions for execution by the machine and that cause the machine to perform any one or more of the functions or methodologies of the present disclosure. Solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium may be used. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention.

Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system comprising:
   memory storing instructions; and
   a processor that executes the instructions to perform operations with respect to an electronic user communication device, the operations comprising:
      providing a notification module that generates a cryptic notification of one or more messages available to a first user account from one or more second user accounts;
      receiving a user notification preference setting for the first user account via a user interface of the user communication device that predefines a cryptic notification to be generated by the notification module for display by the user communication device when a message is available, wherein the cryptic notification is cloaked as an event or operation unrelated to notification of an available message; and
      generating the predefined cryptic notification for display by the user communication device when a message is available to the first user account, wherein the notification module integrates the cryptic notification within a messaging application disguised as a notification of an in-operation event with respect to the messaging application other than an available message for the first user account.

2. A method of generating a notification of an available message on an electronic user communication device comprising:
   providing a notification module that generates a cryptic notification of one or more messages available to a first user account from one or more second user accounts;
   receiving a user notification preference setting for the first user account via a user interface of the user communication device that predefines a cryptic notification to be generated by the notification module for display by the user communication device when a message is available, wherein the cryptic notification is cloaked as an event or operation unrelated to notification of an available message; and
   generating the predefined cryptic notification for display by the user communication device when a message is available to the first user account, wherein the notification module integrates the cryptic notification within a messaging application disguised as a notification of an in-operation event with respect to the messaging application other than an available message for the first user account.

3. A computer readable device comprising instructions, when loaded and executed by a processor, cause the processor to perform options, the operations comprising:
   providing a notification module that generates a cryptic notification of one or more messages available to a first user account from one or more second user accounts;
   receiving a user notification preference setting for the first user account via a user interface of the user communication device that predefines a cryptic notification to be generated by the notification module for display by the user communication device when a message is available, wherein the cryptic notification is cloaked as an event or operation unrelated to notification of an available message; and
   generating the predefined cryptic notification for display by the user communication device when a message is available to the first user account, wherein the notification module integrates the cryptic notification within a messaging application disguised as a notification of an in-operation event with respect to the messaging application other than an available message for the first user account.

* * * * *